(12) United States Patent
Suzuki et al.

(10) Patent No.: US 7,997,743 B2
(45) Date of Patent: Aug. 16, 2011

(54) OPTICAL FILM AND MANUFACTURING METHOD THEREFOR, ANTIGLARE FILM, OPTICAL LAYER-ATTACHED POLARIZER, AND DISPALY APPARATUS

(75) Inventors: Ryo Suzuki, Miyagi (JP); Yumi Haga, Miyagi (JP); Tsutomu Nagahama, Miyagi (JP); Shinichi Matsumura, Miyagi (JP)

(73) Assignee: Sony Corporation, Tokyo (JP)

( * ) Notice: Subject to any disclaimer, the term of this patent is extended or adjusted under 35 U.S.C. 154(b) by 178 days.

(21) Appl. No.: 12/539,996

(22) Filed: Aug. 12, 2009

(65) Prior Publication Data
US 2010/0039708 A1    Feb. 18, 2010

(30) Foreign Application Priority Data
Aug. 13, 2008   (JP) ................................. 2008-208795

(51) Int. Cl.
*G02B 1/10*     (2006.01)
*D06N 7/04*    (2006.01)
*B05D 3/02*    (2006.01)

(52) U.S. Cl. ........................................ 359/601; 428/143
(58) Field of Classification Search .................. 359/599, 359/601; 428/143
See application file for complete search history.

(56) References Cited

U.S. PATENT DOCUMENTS

| 7,505,104 | B2 * | 3/2009 | Watanabe et al. | 349/137 |
|---|---|---|---|---|
| 2003/0112519 | A1 * | 6/2003 | Nakamura et al. | 359/603 |
| 2007/0104896 | A1 * | 5/2007 | Matsunaga et al. | 428/1.3 |
| 2010/0027124 | A1 * | 2/2010 | Nagahama et al. | 359/599 |
| 2010/0079701 | A1 * | 4/2010 | Murayama et al. | 349/64 |
| 2010/0245714 | A1 * | 9/2010 | Watanabe et al. | 349/64 |

FOREIGN PATENT DOCUMENTS

| JP | 07-290652 | 11/1995 |
|---|---|---|
| JP | 2002-202109 | 7/2002 |
| JP | 2000-047010 | 8/2009 |

\* cited by examiner

*Primary Examiner* — Mark Consilvio
(74) *Attorney, Agent, or Firm* — K&L Gates LLP

(57) ABSTRACT

An optical film is provided and includes a base member and an optical layer on the base member. The optical layer has a surface asperity formed by applying a coating material containing microparticles and resin on the base member, distributing the microparticles densely in some parts and sparsely in other parts by convections that occur in the coating material, and curing the coating material. The average diameter of the microparticles is 2.4 µm or more and 8 µm or less. The average thickness of the optical layer is 6.4 µm or more and 18 µm or less. The arithmetic mean roughness Ra of a roughness profile of the optical layer surface is 0.03 µm or more and 0.15 µm or less and the root-mean-square slope RΔq is 0.01 or more and 0.03 or less. The difference in refractive index between the resin and the microparticles is 0 or more and 0.015 or less.

12 Claims, 13 Drawing Sheets

EXAMPLE 1
PARTICLE DIAMETER 5.0 μm, RI=1.505
ACRYL:STYRENE = 85:15

EXAMPLE 2
PARTICLE DIAMETER 4.5 μm, RI=1.510
ACRYL:STYRENE = 80:20

EXAMPLE 3
PARTICLE DIAMETER 5.5 μm, RI=1.515
ACRYL:STYRENE = 75:25

EXAMPLE 4
PARTICLE DIAMETER 5.0 μm, RI=1.525
ACRYL:STYRENE = 65:35

OPTICAL FILM AND MANUFACTURING METHOD THEREFOR, ANTIGLARE FILM, OPTICAL LAYER-ATTACHED POLARIZER, AND DISPALY APPARATUS

CROSS REFERENCES TO RELATED APPLICATIONS

The present application claims priority to Japanese Priority Patent Application JP 2008-208795 filed in the Japan Patent Office on Aug. 13, 2008, the entire content of which is hereby incorporated by reference.

BACKGROUND

The present disclosure relates to optical films and manufacturing methods therefor, antiglare films, optical layer-attached polarizers, and display apparatuses. In particular, it relates to an optical film for use in a display apparatus (display) such as a liquid crystal display apparatus.

In displays such as liquid crystal display apparatuses, the antiglare property can be exhibited and glares caused by surface reflection can be reduced by providing antiglare films at the display surface side to diffuse light emitted from inside (backlight) or light from outside. Typical antiglare films used heretofore have surface asperities that impart antiglare property to the films.

As shown in FIG. 16, a typical antiglare film 101 is formed by applying a coating material containing microparticles 113 such as irregularly shaped silica microparticles or organic microparticles on a base member 111 and drying the applied coating material. According to an antiglare film having such a structure, the microparticles 113 protruding from an antiglare layer 112 scatter the light incident on the antiglare layer 112 and reduce glares caused by surface reflection.

Investigations have been conducted on the asperity shape that can effectively render the antiglare property to antiglare films. For example, Japanese Patent No. 3821956 suggests selecting a centerline mean roughness and a mean profile peak-valley spacing of the asperity profile from the range of 0.08 to 0.5 μm and the range of 20 to 80 μm, respectively, to prevent glaring.

To achieve good antiglare property, Japanese Patent No. 3374299 teaches providing a rough asperity and a fine asperity in the surface, in which the centerline mean roughness Ra and the mean spacing Sm of the surface with these asperities are respectively adjusted to 0.1 to 1.0 μm and 20 to 120 μm, the centerline mean roughness Ra and the mean spacing Sm of the rough asperity are respectively adjusted to 0.5 to 1.5 μm and 100 to 300 μm, and the centerline mean roughness Ra and the mean spacing Sm of the fine asperity are respectively adjusted to 0.05 to 0.5 μm and 20 to 70 μm.

Japanese Patent No. 4001320 suggests adjustment of the difference in refractive index between a light-transmitting resin and light-transmitting microparticles constituting an antiglare layer to 0.02 or more and 0.2 or less to improve the transmission clarity without reducing scattering or antiglare property and to maintain a high level of transmission clarity by increasing the haze value and thereby decreasing the glaring at the surface.

The above-described suggestions made in Japanese Patent Nos. 3821956 and 3374299 aim to scatter light in a wide angle range. The surface asperities have minutes periods and the surface profiles have steep angle components. As a result, the screen of the display apparatus appears grayish brown as a whole. In other words, the contrast is degraded.

The suggestion made in Japanese Patent No. 4001320 aims to prevent scintillation by controlling the difference in refractive index between a light-transmitting resin and light-transmitting microparticles, the particle diameter, and the amount of microparticles to be added, thereby increasing the internal scattering. Although a relatively high transmission clarity can be obtained by this arrangement, backscattering caused by internal haze increases and the total luminous transmittance is degraded.

A conceivable approach to solving these problems is to decrease the difference in refractive index between the resin and the particles and to decrease the internal haze. However, it is still difficult to achieve sufficient antiglare property.

In some cases, face plates for providing mechanical, thermal, and weathering protections and improving design are installed in front of (at the viewer's side of) display apparatuses such as liquid crystal displays and organic EL displays. In such cases, when a rear surface (display apparatus side) of a front plate is flat and happens to come close to the display apparatus such as when the front plate is deflected, Newton's rings occur, which is not desirable.

The problems of deflection of components and resulting occurrence of Newton's rings are particularly severe in the cases where a rear surface component is installed at the rear surface side of a display apparatus. This is because the space between the display apparatus and the component at the rear side is narrowed as the thickness of the display apparatus is reduced and because the size of the display apparatus is increasing. Take a liquid crystal display for example. In a liquid crystal display, a diffusing plate for making illuminance of light from light source uniform in an in-plane direction, a lens film for controlling the viewing angle, and a polarization separation reflection film configured to polarize and separate light for reuse are provided as the rear surface components. However, a polarizing plate at the rear surface side of the liquid crystal panel and disposed in front of these rear surface components usually has a flat surface profile. Thus, occurrence of Newton's rings has been problem for thin liquid crystal displays. In view of the above, an optical film that can suppress occurrence of such Newton's ring has been desired.

It is desirable to provide an optical film and a manufacturing method therefor, an antiglare film, an optical layer-attached polarizer, and a display apparatus that can achieve both good contrast and antiglare property.

It is also desirable to provide an optical film and a manufacturing method therefor, an antiglare film, an optical layer-attached polarizer, and a display apparatus that can achieve both good contrast and antiglare property and that can suppress occurrence of Newton's rings.

SUMMARY

The antiglare property can be imparted by decreasing the difference in refractive index between a light-transmitting resin and light-transmitting microparticles to reduce the internal haze, i.e., to improve the total luminous transmittance and by forming surface asperities that are effective in achieving the antiglare property and have controlled angle components. In other words, an optical film that can achieve both the antiglare property and an improved luminance by improved total luminous transmission has been obtained.

A first embodiment provides an optical film that includes a base member and an optical layer disposed on the base member, the optical layer having an asperity in a surface. The asperity is formed by applying a coating material containing microparticles and a resin on the base member, distributing the microparticles densely in some parts and sparsely in other parts by convections that occur in the coating material, and curing the coating material. The average diameter of the microparticles is 2.4 µm or more and 8 µm or less. The average thickness of the optical layer is 6.4 µm or more and 18 µm or less. The arithmetic mean roughness Ra of a roughness profile of the surface of the optical layer is 0.03 µm or more and 0.15 µm or less and the root-mean-square slope RΔq of the roughness profile is 0.01 or more and 0.03 or less. The difference in refractive index between the resin and the microparticles is 0 or more and 0.015 or less.

A second embodiment provides a method for making an optical film, the method including steps of applying a coating material containing microparticles and a resin on a base member; drying the coating material to create convections in the coating material and distributing the microparticles by the convections so that the microparticles are distributed densely in some parts and sparsely in other parts; and curing the coating material in which the microparticles are distributed densely in some parts and sparsely in other parts to form an optical layer. The average diameter of the microparticles is 2.4 µm or more and 8 µm or less. The average thickness of the optical layer is 6.4 µm or more and 18 µm or less. The arithmetic mean roughness Ra of a roughness profile of a surface of the optical layer is 0.03 µm or more and 0.15 µm or less and the root-mean-square slope RΔq of the roughness profile is 0.01 or more and 0.03 or less. The difference in refractive index between the resin and the microparticles is 0 or more and 0.015 or less.

A third embodiment provides an antiglare film that includes a base member and an antiglare layer disposed on the base member, the antiglare layer having an asperity in a surface. The asperity is formed by applying a coating material containing microparticles and a resin on the base member, distributing the microparticles densely in some parts and sparsely in other parts by convections that occur in the coating material, and curing the coating material. The average diameter of the microparticles is 2.4 µm or more and 8 µm or less. The average thickness of the antiglare layer is 6.4 µm or more and 18 µm or less. The arithmetic mean roughness Ra of a roughness profile of the surface of the antiglare layer is 0.03 µm or more and 0.15 µm or less and the root-mean-square slope RΔq of the roughness profile is 0.01 or more and 0.03 or less. The difference in refractive index between the resin and the microparticles is 0 or more and 0.015 or less.

A fourth embodiment provides an optical layer-attached polarizer that includes a polarizer and an optical layer disposed on the polarizer, the optical layer having an asperity in a surface. The asperity is formed by applying a coating material containing microparticles and a resin, distributing the microparticles densely in some parts and sparsely in other parts by convections that occur in the coating material, and curing the coating material. The average diameter of the microparticles is 2.4 µm or more and 8 µm or less. The average thickness of the optical layer is 6.4 µm or more and 18 µm or less. The arithmetic mean roughness Ra of a roughness profile of the surface of the optical layer is 0.03 µm or more and 0.15 µm or less and the root-mean-square slope RΔq of the roughness profile is 0.01 or more and 0.03 or less. The difference in refractive index between the resin and the microparticles is 0 or more and 0.015 or less.

A fifth embodiment provides a display apparatus that includes a display unit configured to display images and an optical layer disposed at a display surface side of the display unit, the optical layer having an asperity in a surface. The asperity is formed by applying a coating material containing microparticles and a resin, distributing the microparticles densely in some parts and sparsely in other parts by convections that occur in the coating material, and curing the coating material. The average diameter of the microparticles is 2.4 µm or more and 8 µm or less. The average thickness of the optical layer is 6.4 µm or more and 18 µm or less. The arithmetic mean roughness Ra of a roughness profile of the surface of the optical layer is 0.03 µm or more and 0.15 µm or less and the root-mean-square slope RΔq of the roughness profile is 0.01 or more and 0.03 or less. The difference in refractive index between the resin and the microparticles is 0 or more and 0.015 or less.

A sixth embodiment provides a display apparatus that includes a display unit configured to display images, a front member disposed at a front surface side of the display unit, and an optical layer disposed at the front surface side of the display unit and/or a rear surface side of the front member, the optical layer having an asperity in a surface. The asperity is formed by applying a coating material containing microparticles and a resin, distributing the microparticles densely in some parts and sparsely in other parts by convections that occur in the coating material, and curing the coating material. The average diameter of the microparticles is 2.4 µm or more and 8 µm or less. The average thickness of the optical layer is 6.4 µm or more and 18 µm or less. The arithmetic mean roughness Ra of a roughness profile of the surface of the optical layer is 0.03 µm or more and 0.15 µm or less and the root-mean-square slope RΔq of the roughness profile is 0.01 or more and 0.03 or less. The difference in refractive index between the resin and the microparticles is 0 or more and 0.015 or less.

A seventh embodiment provides a display apparatus that includes a display unit configured to display images, a rear member disposed at a rear surface side of the display unit, and an optical layer disposed at the rear surface side of the display unit and/or a front surface side of the rear member, the optical layer having an asperity in a surface. The asperity is formed by applying a coating material containing microparticles and a resin, distributing the microparticles densely in some parts and sparsely in other parts by convections that occur in the coating material, and curing the coating material. The average diameter of the microparticles is 2.4 µm or more and 8 µm or less. The average thickness of the optical layer is 6.4 µm or more and 18 µm or less. The arithmetic mean roughness Ra of a roughness profile of the surface of the optical layer is 0.03 µm or more and 0.15 µm or less and the root-mean-square slope RΔq of the roughness profile is 0.01 or more and 0.03 or less. The difference in refractive index between the resin and the microparticles is 0 or more and 0.015 or less.

In these embodiments, an optical layer having a surface asperity and an average thickness of 6.4 µm or more and 18 µm or less is formed by pplying a coating material containing microparticles having an average diameter of 2.4 µm or more and 8 µm or less and a resin, distributing the microparticles densely in some parts and sparsely in other parts by convections that occur in the coating material, and curing the coating material. As a result, the arithmetic mean roughness Ra of the optical layer surface can be adjusted to 0.04 µm or more and 0. 15 µm or less and the root-mean-square slope RΔq can be adjusted to 0.01 or more and 0.03 or less. In other words, an asperity that can effectively impart antiglare property and has controlled angle components can be formed in the surface.

Moreover, since the difference in refractive index between the resin and the microparticles is 0 or more and 0.015 or less, the internal haze can be reduced, i.e., the total luminous transmittance can be improved.

The optical films of these embodiments have high transmission clarity despite the surface asperity. Thus, they can be installed in front of a display apparatus and used as antiglare layers or antiglare films. Moreover, they can be used as anti-Newton ring layers or anti-Newton ring films.

As described above, according to these embodiments, the difference in refractive index between a light-transmitting resin and light-transmitting microparticles is decreased, and the internal haze is reduced, i.e., the total luminous transmittance is improved. Thus, the films can effectively impart antiglare property. Since an asperity with controlled angle components is formed in the surface, improved luminance and antiglare property can both be achieved. Since the light efficiency from the backlight can be improved due to the improved total luminous transmittance, the brightness of white for the contrast is improved and energy consumption can be reduced.

Additional features and advantages are described herein, and will be apparent from the following Detailed Description and the figures.

DETAILED DESCRIPTION

Figure 1:
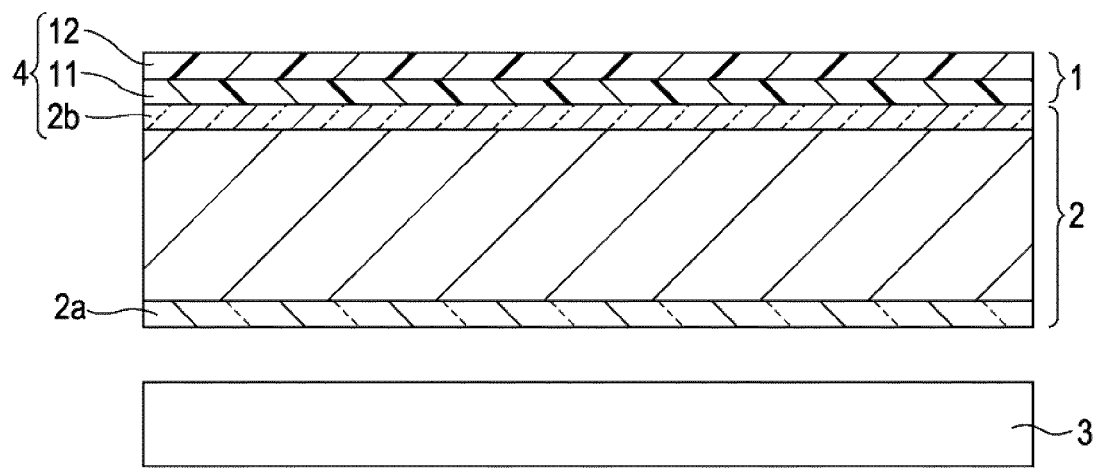
FIG. 1 is a schematic cross-sectional view showing one example of a structure of a liquid crystal display apparatus according to a first embodiment.

Embodiments will now be described with reference to the drawings. In all drawings referred to in the embodiments described below, the same or corresponding components are represented by the same reference characters.

1. First Embodiment

1.1. Structure of Liquid Crystal Display Apparatus

FIG. 1 shows one example of a structure of a liquid crystal display apparatus according to a first embodiment. As shown in FIG. 1, the liquid crystal display apparatus includes a backlight 3 configured to emit light and a liquid crystal panel 2 configured to temporally and spatially modulate light emitted from the backlight 3 to display images. Polarizers 2a and 2b are respectively disposed on two surfaces of the liquid crystal panel 2. An antiglare film 1 is disposed on the polarizer 2b disposed at the display surface side of the liquid crystal panel 2. In this embodiment, the polarizer 2b with the antiglare film 1 or an antiglare layer formed on one main surface thereof is referred to as an "antiglare polarizer 4".

A direct-type backlight, an edge-type backlight, or a planar light source-type backlight can be used as the backlight 3. The backlight 3 includes a light source, a reflecting plate, and an optical film, for example. Examples of the light source include a cold cathode fluorescent lamp (CCFL), a hot cathode fluorescent lamp (HCFL), an organic electroluminescence (OEL), and a light emitting diode (LED).

Examples of the usable display mode for the liquid crystal panel 2 include a twisted nematic (TN) mode, a super twisted nematic (STN) mode, a vertically aligned (VA) mode, an in-plane switching (IPS) mode, an optically compensated birefringence (OCB) mode, a ferroelectric liquid crystal (FLC) mode, a polymer dispersed liquid crystal (PDLC) mode, and a phase change guest host (PCGH) mode.

The polarizers 2a and 2b are respectively disposed on two surfaces of the liquid crystal panel 2 by having their transmission axes orthogonally intersecting each other, for example. The polarizers 2a and 2b each allow only one of orthogonal polarized components of incident light to pass while blocking the other by absorption. The polarizers 2a and 2b may each be an uniaxially stretched hydrophilic polymer film such as a polyvinyl alcohol film, a partially formalized polyvinyl alcohol film, an ethylene/vinyl acetate copolymer partially saponified film, or the like, with a dichronic material, such as iodine, a dichronic dye, or the like, adsorbed thereto.

1.2. Structure of Antiglare Film

Figure 2:
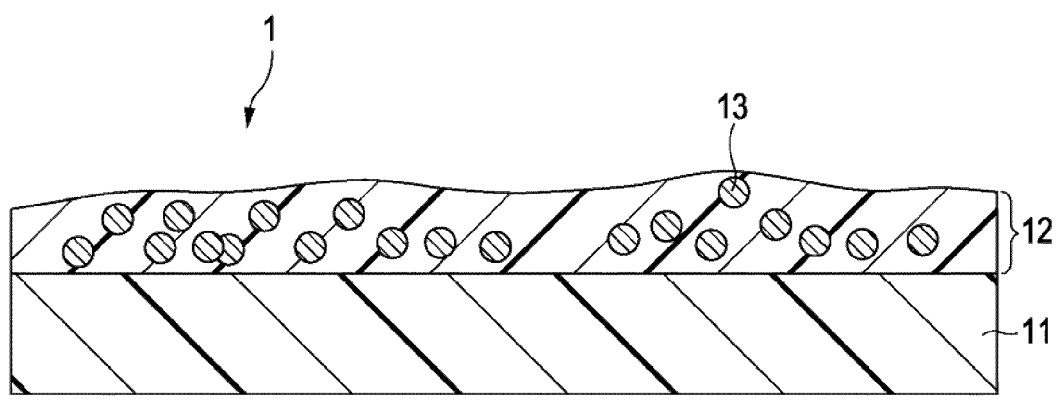
FIG. 2 is an enlarged cross-sectional view showing one example of a structure of an antiglare film according to the first embodiment.

FIG. 2 shows one example of a structure of the antiglare film 1 according to the first embodiment. As shown in FIG. 2, the antiglare film 1 includes a base member 11 and an antiglare layer 12 disposed on the base member 11. The antiglare layer 12 contains microparticles 13 and has a surface in which fine asperities are formed.

The surface haze is preferably 0 to 5%, and more preferably 0 to 1%. At a surface haze of 5% or less, the cloudy feel is reduced. At a surface haze of 1% or less, substantially no cloudy feel occurs. Note that the surface haze is a value detected by measuring surface scattering. The higher the surface haze, the higher the cloudiness.

Internal haze is related to total luminous transmittance, i.e., transmitting property, and is preferably 0 to 20% and more preferably 0 to 10%. At an internal haze exceeding 20%, the effect of backscattering appears and degrades the transmitting property. The smaller the internal haze, the better the transmitting property. However, in the case where glaring occurs by interference with a display element or the like, the internal haze can be controlled within the range of 0 to 20%.

The total haze is the sum of the surface haze and the internal haze and may be any value as long as the surface haze and the internal haze are within the designated ranges.

The total haze is preferably 3 to 45%, more preferably 3 to 40%, and most preferably 3 to 30%. In the range of 3 to 45%, an adequate degree of antiglare property can be obtained without decreasing the image clarity. In other words, at a total haze of less than 3%, sufficient antiglare property is difficult to achieve. At a total haze exceeding 45%, the image clarity is decreased.

The difference in refractive index between the resin and the microparticles is preferably 0 to 0.015 and more preferably 0 to 0.010. When the difference in refractive index between the resin and the microparticles is more than 0.015, the internal haze significantly increases relative to the amount added, and a target surface roughness is difficult to achieve. In the case where acryl/styrene copolymer microparticles that yield the difference in refractive index beyond the above-described range, the microparticles tend to aggregate due to the relationship between the surface energy of the microparticles and the surface tension of the solvent and the surface haze increases, resulting in cloudier appearance. At a difference in refractive index described above, scattering of light can be suppressed, the total luminous transmittance exhibits 91.5% or more, and the haze inside the antiglare layer can be decreased. Thus, the property to transmit light from the backlight can be improved and a high contrast can be achieved.

The cloudiness degree measured by bonding a black acryl plate on the rear surface of the antiglare film 1 is preferably 1.1 or less and more preferably 0.9 or less. At a cloudiness degree of 1.1 or less, the decrease in contrast can be suppressed. At a cloudiness degree of 0.9 or less, good contrast can be achieved.

The surface profile is formed by a particle distribution formed by drying and curing by heat or irradiation with ionizing radiations after the drying. In other words, a desired surface roughness can be achieved by controlling the distribution of the microparticles (density of particles) and the cure shrinkage ratio of the resin.

With respect to the distribution of the microparticles, the ratio of the resin in a portion where microparticles are densely present is low and, moreover, these microparticles obstruct curing, resulting in a low cure shrinkage ratio. In contrast, in a portion where microparticles are sparsely present, the ratio of the resin is high and the cure shrinkage ratio of the resin increases. Because of the difference in cure shrinkage ratio between these two portions, moderate asperities appear in the coating material surface and the antiglare layer surface exhibits antiglare property.

Controlling the cure shrinkage ratio is particularly important. According to the findings made through experiments by the inventors of the present invention, incorporation of 3 to 20 wt %, preferably 5 to 15 wt % of polymer relative to the total amount of resin yields an adequate degree of cure shrinkage, which forms desired surface asperities. At a polymer content less than 3 wt %, the cure shrinkage is significantly large, and this increases the roughness of the surface, increases the root-mean-square slope R∆q and the arithmetic mean roughness Ra, and thus increases the cloudiness degree. In this embodiment, a polymer is added to adjust the cure shrinkage as described above. However, when an excessive amount (more than 20 wt %) of polymer is added, in other words, when the ratio of the material that inhibits curing increases, the viscosity of the coating material also increases. As a result, the dispersibility of the microparticles is degraded, and the parts where microparticles are sparse and the parts where microparticles are dense become clearly identifiable to an unnecessary degree. As a result, the difference in cure shrinkage notably appears between the dense and sparse portions and increases the cloudiness degree. Moreover, when an excessive amount (more than 20 wt %) of polymer is added, the hardness of the coating layer decreases significantly.

Base Member

A plastic film having transparency may be used as the material for the base member 11, for example. The transparent plastic film may be composed of a widely available polymer film, for example. Examples of the widely available polymer film include triacetyl cellulose (TAC), polyesters (TPEE), polyethylene terephthalate (PET), polyimide (PI), polyamide (PA), aramid, polyethylene (PE), polyacrylate (PAR), polyethersulfone, polysulfone, polypropylene (PP), diacetyl cellulose, polyvinyl chloride, acryl resins (PMMA), polycarbonate (PC), epoxy resins, urea resins, urethane resins, and melamine resins. The thickness of the base member 11 is preferably 38 µm to 100 µm in view of productivity but is not limited to this.

Antiglare Layer

The antiglare layer 12 includes microparticles 13 and a resin. The microparticles 13 are distributed densely in some parts and sparsely in other parts in the antiglare layer 12. If necessary, the antiglare layer 12 may contain a photostabilizer, a UV absorber, an antistatic agent, a flame retardant, an antioxidant, and the like as additives.

Preferably, the microparticles 13 are covered with the resin at the surface of the antiglare layer 12. Covering the microparticles 13 as such prevents the microparticles 13 from protruding from the antiglare layer 12 and suppresses an increase in cloudiness degree caused by formation of high-angle-components derived from the curvatures of the microparticles themselves in the surface.

The ratio R (=D/T×100, where T is the average thickness of the antiglare layer 12 and D is the average diameter of the microparticles 13) is preferably 30% or more and 70% or less, and more preferably 30% or more and 60% or less. When the ratio R is less than 30%, the antiglare property is degraded. At a ratio R exceeding 70%, the number of microparticles 13 near the surface increases, resulting in an increased cloudiness degree and lower contrast.

The thickness of the antiglare layer 12 is preferably 6.4 µm or more an 18 µm or less, more preferably 8 µm or more and 16 µm or less, and most preferably 11 µm or more and 13 µm or less. The ranges are set as such because at an average thickness of less than 6.4 µm, sufficient hardness is not obtained and at an average thickness exceeding 18 µm, significant curling occurs during manufacture in the step of curing the resin.

Spherical or flat organic microparticles are used as the microparticles 13, for example. The average diameter of the microparticles 13 is 2.4 µm or more and 8 µm or less, and more preferably 4 µm or more and 6 µm or less. As the average diameter of the microparticles 13 decreases, the number of microparticles near the surface increases, thereby increasing the cloudiness degree by surface scattering. At an average diameter less than 2.4 µm, the increase in cloudiness degree becomes significant. At an average diameter exceeding 8 µm, the image clarity decreases and glaring may occur when applied to high-definition displays. In this embodiment, the average diameter of the microparticles 13 is measured by a pore electric resistance method.

The amount of the microparticles 13 added is preferably 8 parts by weight or more and 50 parts by weight or less, more preferably 10 parts by weight or more and 30 parts by weight or less, and most preferably 10 parts by weight or more and 20 parts by weight or less per 100 parts by weight of the resin.

When the amount of the microparticles 13 added is less than 8 parts by weight, sparseness and denseness of the microparticles 13 in the in-plane direction become clearly distinguishable. Thus, the roughness increases and a clear image is difficult to obtain. In contrast, when the amount of the microparticles 13 added exceeds 50 parts by weight, the haze increases, the value of image clarity decreases, and the image contrast of the display apparatus decreases as a result. However, the internal scattering of the antiglare layer can be suppressed by decreasing the difference in refractive index between the microparticles 13 and the light-transmitting resin. Thus, depending on the desired image contrast, the amount of the microparticles 13 added and the difference in refractive index between the microparticles 13 and the light-transmitting resin are preferably adjusted within the ranges of this embodiment.

Organic microparticles that achieve a difference in refractive index between the matrix resin and the organic microparticles of 0 or more and 0.015 or less are preferred. For example, acryl particles, microparticles mainly composed of acryl/styrene copolymers, and styrene particles can be used, but the organic microparticles are not limited to these.

A widely available light-transmitting resin can be used as the light-transmitting resin, as described below. In view of the image transmission property and tolerance to damage, a material having good light-transmitting property and a high hardness is preferred. In particular, a light-transmitting resin containing a UV-curable resin and a polymer is preferred. In general, the refractive index of such a light-transmitting resin is 1.5 to 1.6.

In the case where the microparticles 13 mainly composed of an acryl/styrene copolymer are used, it is preferable to use microparticles 13 mainly composed of a cross-linking poly (meth)acrylate copolymer having an acryl content of 55 wt % to 85 wt % in combination with the above-described light-transmitting resin. In this manner, a difference in refractive index of 0 or more and 0.015 or less can be achieved. At the same time, an adequate distribution of dense and sparse parts can be formed and a desired surface roughness can be achieved. Since the acryl content can be used to control aggregation and dispersion, the microparticles 13 are preferably mainly composed of an acryl/styrene copolymer.

The particle distribution formed during drying can also be controlled without using the acryl/styrene copolymer (without incorporation of a styrene). That is, in the case where acryl microparticles adjusted by controlling the blend ratio of acryl resins having different structures and different numbers of functional groups are used, the surfaces of microparticles may be hydrophilized or hydrophobized to control the particle distribution.

In the case where microparticles, such as acryl resin microparticles, slightly polarized are used as the microparticles 13, the convections in the coating material that occur during drying decrease. Thus, the microparticles are dispersed and a desired particle distribution is difficult to achieve. A solvent having a high surface tension is desirably used to overcome such a problem. However, such a solvent has a high boiling point, and the resulting coating film is not readily dried, resulting in difficulty of handling during manufacturing. Accordingly, it is preferable to use microparticles in which a nonpolar resin, such as a styrene, is blended. When microparticles mainly composed of an acryl/styrene copolymer are used, the surface energy can be changed by changing the composition ratio of the acryl and styrene during synthesis. Among microparticles mainly composed of acryl/styrene copolymers, those having an acryl content of 55 wt % to 85 wt % are particularly preferred. This is because the desired particle distribution can be achieved, and the desired surface profile can be formed by adding a process of controlling the cure shrinkage.

The arithmetic mean roughness Ra of the roughness profile of the surface of the antiglare layer 12 is 0.03 µm or more and 0.15 µm or less. When the arithmetic mean roughness Ra of the roughness profile is less than 0.03 µm, the antiglare property is degraded. At Ra exceeding 0.15 µm, the contrast is degraded.

Figure 3:
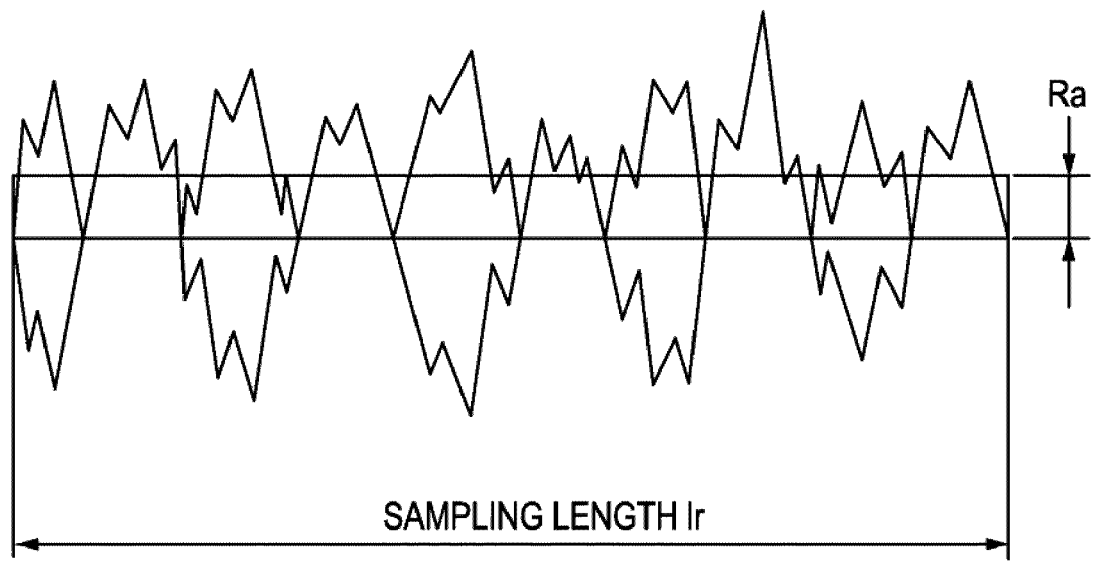
FIG. 3 is a schematic view for explaining the arithmetic mean roughness Ra.

FIG. 3 is a graph for explaining the arithmetic mean roughness Ra. The arithmetic mean roughness Ra is an absolute mean value of Z(x) in a sampling length, as shown by equation (1) below and a smaller Ra indicates a higher flatness. When the arithmetic mean roughness Ra is less than 0.03 µm, the antiglare surface is close to a mirror surface, and this increases the mirror-reflected components relative to the incident light and degrades the antiglare property.

The upper limit value of the arithmetic mean roughness Ra is not particularly limited as long as the root-mean-square slope RΔq is in the range of 0.01 or more and 0.03 or less. However, the experiments show that the root-mean-square slope RΔq increases with the arithmetic mean roughness Ra. Accordingly, when the arithmetic mean roughness Ra exceeds 0.15 µm, the root-mean-square slope RΔq exceeds 0.03 µm, thereby decreasing the contrast.

$$Ra = \frac{1}{lr}\int_0^{lr} |Z(x)|\,dx \qquad (1)$$

Although the value obtained by averaging the angle components of the surface can be expressed by RΔq(θa) as described above, merely controlling RΔq(θa) is not sufficient. A higher contrast can be achieved by making the surface uniformly gentle. Ra can be used as the parameter therefor. A film having a uniformly gentle surface can be obtained by controlling RΔq in the range of 0.01 to 0.03 and Ra to 0.15 or less.

Figure 4:
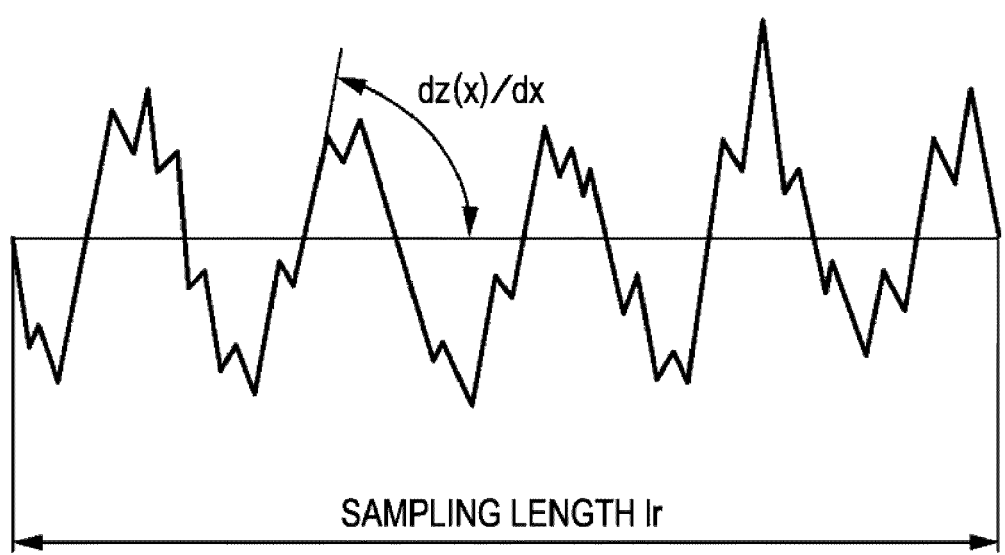
FIG. 4 is a schematic diagram for explaining the root-mean-square slope.

FIG. 4 is a schematic diagram for explaining the root-mean-square slope. The root-mean-square slope RΔq of the roughness profile is a parameter obtained by averaging the slopes in micro regions and is defined by equation (2) below:

$$R\Delta q, P\Delta q, W\Delta q = \sqrt{\frac{1}{lr}\int_0^{lr}\left(\frac{d}{dx}Z(x)\right)^2 dx} \qquad (2)$$

where RΔq (Rdq) represents a root mean square slope of the roughness profile, PΔq (or Pdq) represents a root mean square slope of the primary profile, and WΔq (or Wdq) represents a root mean square slope of the waviness profile.

The root-mean-square slope RΔq and the optical characteristics (contrast (cloudy feel) and antiglare property) are correlated. In other words, the contrast and the antiglare property can be controlled by controlling the root-mean-square slope RΔq. Both good contrast and good antiglare property can be simultaneously achieved when the root-mean-square slope RΔq is 0.01 or more and 0.03 or less.

The root-mean-square slope RΔq is correlated to the cloudy feel. Because the root-mean-square slope RΔq is the average of the slopes in the micro regions, the surface scattering will increase if a steep slope is contained in the components constituting the surface, i.e., if the root-mean-square slope RΔq exceeds 0.03, thereby increasing the cloudy feel. In other words, the photopic contrast is degraded. At a rootmean-square slope RΔq less than 0.01 μm, the surface is close to a mirror surface, the mirror reflection components increase, and thus the antiglare property is significantly degraded. A surface profile parameter similar to the root-mean-square slope RΔq is an mean slope angle θa (Japanese Industrial Standard (JIS) B 0601-1994). The mean slope angle θa is similar to the root-mean-square slope RΔq in that it represents a slope. However, in the above equation for determining the root-mean-square slope RΔq, the differentiated value of the micro region is squared and averaged. Thus, a larger angle component (which affects the cloudy feel) is emphasized. Accordingly, the root-mean-square slope RΔq has a higher sensitivity to the cloudiness degree than the mean slope angle θa.

The mean width RSm of the roughness profile is correlated to how the antiglare property is exhibited. The mean width of the roughness profile is the average of the lengths Xs of the profile elements in the sampling length and is represented by equation (3) below:

$$RSm = \frac{1}{m}\sum_{i=1}^{m} XSi \quad (3)$$

The mean width RSm of the roughness profile is preferably 0.05 mm or more and 0.2 mm or less, and more preferably 0.08 mm or more and 0.15 mm or less. At RSm less than 0.05 mm, the antiglare property is not likely to be exhibited. At RSm exceeding 0.2 mm, the surface tends to coarsen to a degree identifiable with naked eye. By controlling RSm in the range of 0.08 mm or more and 0.15 mm or less, good antiglare property can be exhibited even in an environment where intense light is vertically incident on a liquid crystal display apparatus.

Figure 16:
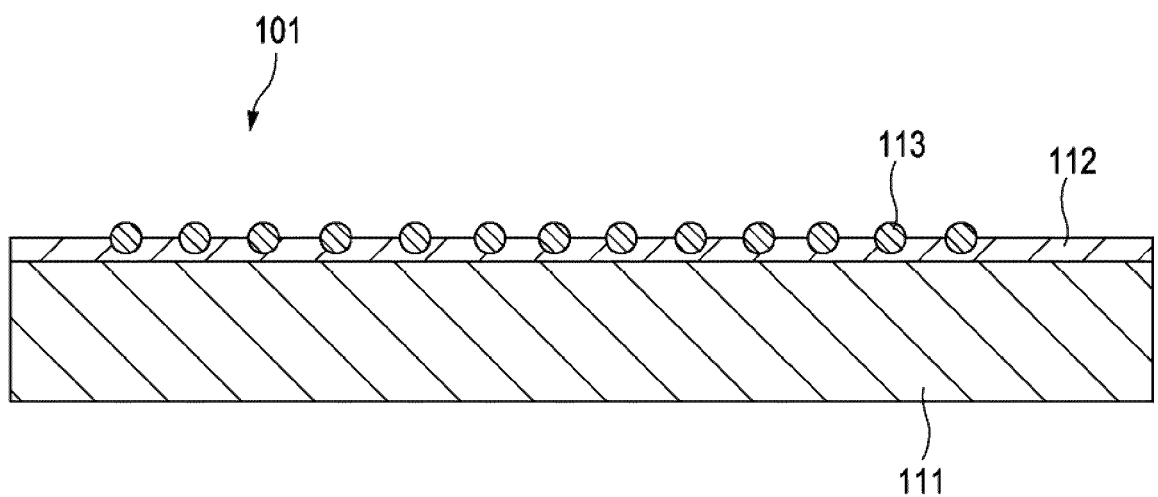
FIG. 16 is an enlarged cross-sectional view showing a structure of an antiglare film of related art.

The root-mean-square slope RΔq of the antiglare film 1 of the first embodiment is smaller than that of the antiglare films of the related art. Considering that the root-mean-square slope RΔq is a parameter obtained by averaging the slopes in micro regions, this indicates the following. That is, as shown in FIG. 2, the antiglare film 1 of the first embodiment has a continuous, gentle asperity whereas an antiglare film of the related art has an asperity that contains steep angle components, as shown in FIG. 16. Whereas the antiglare film 1 of the first embodiment can suppress scattering of light over a wide angle range and decrease the cloudiness of the display screen, the antiglare film of the related art scatters light over a wide angle range and renders a cloudy display screen. Note that in the antiglare film of the related art shown in FIG. 16, the asperity is determined by the particle size and the amount of protruding microparticles.

As the antistatic agent, a conductive carbon, inorganic microparticles, inorganic fine powder, a surfactant, an ionic liquid, or the like may be used. These antistatic agents may be used alone or in combination. Examples of the materials for the inorganic microparticles and inorganic fine powder include materials mainly composed of conductive metal oxides. Examples of the conductive metal oxides include tin oxide, indium oxide, antimony-doped tin oxide (ATO), indium-doped tin oxide (ITO), and antimony zinc oxide. When inorganic microparticles are used as the antistatic agent, at least part of the microparticles 13 constituting the aggregates described above is preferably inorganic microparticles that serve as the antistatic agent.

Examples of the surfactant include anionic or amphoteric compounds such as carboxylic compounds and phosphate salts; cationic compounds such as amine compounds and quaternary ammonium salts; nonionic compounds such as fatty acid polyhydric alcohol ester compounds and polyoxyethylene adducts; and polymer compounds such as polyacrylic acid derivatives. Ionic liquids are molten salts that are liquid at room temperature. Ionic liquids preferably have compatibility with the solvent and the resin and preferably remain dissolved in the resin after the solvent is evaporated in the drying step described below. Ionic liquids that have a small surfactant effect and do not affect the convection and aggregation of the microparticles 13 when added in the coating material are preferred. Specific examples of the cationic species of the ion pairs include fatty acid-group quaternary ammonium cations composed of nitrogen-containing oniums, quaternary ammonium cations having nitrogen-containing heterocyclic structures, phosphonium cations composed of phosphorus-containing onium salts, and sulfonium cations composed of sulfur-containing oniums. Examples of the anionic species of the ion pairs include halogen anions, organic carboxyl group anions, and organic fluorine anions. In particular, the anion is preferably an organic fluorine anion such as tris(trifluoromethylsulfonyl)nitric acid since it readily forms a liquid ion pair at normal temperature. The ionic liquid preferably contains no long-chain alkyl group in the ion pair. When a long-chain alkyl group is contained in the ion pair, the surface-activating effect becomes strong and affects aggregation of the microparticles 13. A plurality of types of ionic liquids may be used in combination.

1.3. Properties of Antiglare Film

Figure 5:
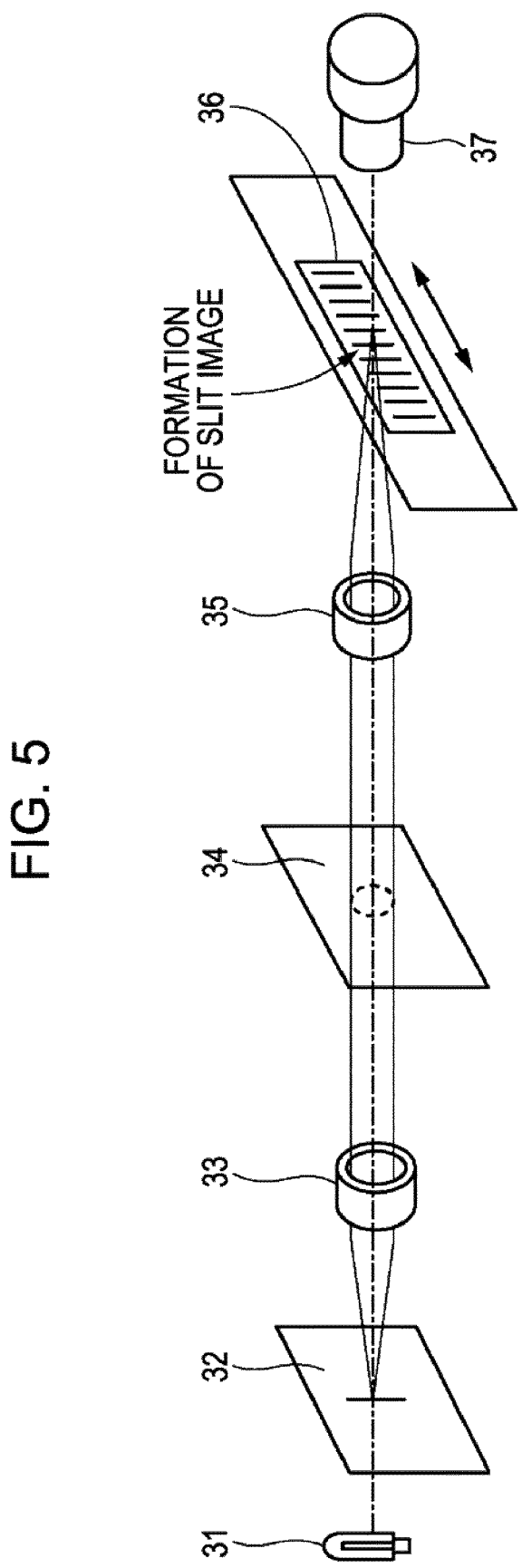
FIG. 5 is a schematic view for explaining a structure of an image clarity meter used in evaluating the clarity of a transmitted image.

The clarity of transmitted images of the antiglare film 1 can be evaluated by using an image clarity tester according to JIS-K7105 (testing methods for optical properties of plastics). This testing method will now be described with reference to FIG. 5. As shown in FIG. 5, the image clarity tester includes a light source 31, a slit 32, a lens 33, another lens 35, optical combs 36, and a photoreceiver 37. A test specimen 34 (e.g., the antiglare film 1) which is an object to be measured is disposed between the lens 33 and the lens 35. The slit 32 is disposed at the focal position of the lens 33, and the optical comb 36 is disposed at the focal position of the lens 35. The optical combs having comb widths of 2 mm, 1 mm, 0.5 mm, 0.25 mm, and 0.125 mm are provided as the optical combs 36, and an adequate one of the optical combs 36 is selected and used.

In this test method, light emitted from the light source 31 is extracted as an artificial line light source through the slit 32 and is allowed to pass through the lens 33 so that the light is vertically incident on the test specimen 34 as parallel light. The light is then focused again using the lens 35, and the light that has passed through the optical comb 36 is received with the photoreceiver 37. The contrast between bright and dark portions is determined by calculation. In the case where there is no test specimen 34 or the test specimen 34 is an optically homogeneous medium, light is focused to the size of the slit 32 at the optical comb 36. Thus, if the aperture size of the optical comb 36 is larger than the slit 32, the quantity of the light received is 100% at a position corresponding to the transparent portion of the optical comb 36 and 0% at a position corresponding to the non-transparent portion of the optical comb 36. In contrast, when the test specimen 34 creates blurs, the image of the slit 32 focused on the optical comb 36 is wider due to blurring. Thus, the quantity of light received at a position corresponding to the transparent portion of the optical comb 36 decreases from 100% since the two ends of the image of the slit 32 overlap the non-transparent portions of the optical comb 36. The quantity of light received at a position corresponding to the non-transparent portion of the optical comb 36 increases from 0% since light leaks from the non-transparent portions overlapping the two ends of the slit image.

The observed transmitted image clarity value C is defined by the following equation on the basis of the transmitted light maximum value M at the transparent portion of the optical comb 36 and the transmitted light minimum value m at the non-transparent portion of the optical comb 36:

$$\text{Transmitted image clarity value } C(\%) = \{(M-m)/(M+m)\} \times 100$$

A high transmitted image clarity value C indicates that the transmitted image clarity is high and a low value C indicates that the image is blurred or distorted. In the description below, the transmitted image clarity value C(2.0) measured with an optical comb having a comb width of 2 mm according to JIS-K7105 is referred to as "value C(2.0) at a 2 mm comb width" as needed. Likewise, values of the transmitted image clarity measured with optical combs having comb widths of 1 mm, 0.5 mm, 0.25 mm, and 0.125 mm are respectively referred to as "value C(1.0) at a 1 mm comb width", "value C(0.5) at a 0.5 mm comb width", "value C(0.25) at a 0.25 mm comb width", and "value C(0.125) at a 0.125 mm comb width" as needed.

The transmitted image clarity value C of the antiglare film 1 of the first embodiment measured according to JIS K7105 is set as follows so that good contrast is achieved for fine images and highly clear images are obtained while achieving antiglare property.

The value C(0.125) at a 0.125 mm comb width of the antiglare film 1 is 45 or more and 100 or less, preferably 55 or more and 98 or less, and most preferably 65 or more and 98 or less. The value C(0.125) at a 0.125 mm comb width is 45 or more since a high contrast image can be obtained for a fine pitch transmitted image and, when the antiglare film 1 is applied to a display apparatus having fine-pitched pixels, glares in the surface can be prevented.

The ratio of the value C(0.125) at a 0.125 mm comb width to the value C(2.0) at a 2 mm comb width of the anti-glare film 1, i.e., ([C(0.125)/C(2.0)]×100), is preferably 50% or more and 100% or less, more preferably 65% or more and 100% or less, and most preferably 80% or more and 100% or less. In some cases, the ratio ([C(0.125)/C(2.0)]×100) obtained by measurement exceeds 100. In such cases, the ratio is deemed to be 100. The roughness of the reflected image can be suppressed by controlling the ratio to 50% or more. A small ratio between these two values means that the roughness of the macroscopically observed surface (i.e., to an extent that can resolve 2.0 mm) differs from the roughness of the microscopically observed surface (i.e., to an extent that can resolve 0.125 mm). In such a case, the possibility that local projections are formed is high and when an image is reflected by such a surface, the image appears rough.

The total value of the transmitted image clarity measured with optical combs respectively having comb widths of 0.125 mm, 0.5 mm, 1.0 mm, and 2.0 mm, i.e., (C(0.125)+C(0.5)+C(1.0)+C(2.0)), is preferably 230 or more and 400 or less, more preferably 270 or more and 400 or less, and most preferably 300 or more and 400 or less. A display with a high contrast can be obtained for any types of images by this arrangement. The observed value using a comb having a large width is not excessively lower than the observed value using a comb having a small width. Thus, in the case where the total is 220%, the transmitted image clarity observed using a 2.0 mm width comb is 55 at the minimum. At a contrast value lower than this, the image appears blurred.

1.4. Method for Making Antiglare Film

Next, an example of a method for making the antiglare film 1 having the above-described structure is described. According to this method for making the antiglare film 1, a coating material containing microparticles 13, a resin, and a solvent is applied on a base member 11, and the resin is cured after the solvent is dried.

Preparation of Coating Material

First, for example, a resin, microparticles 13, and a solvent are mixed in a stirrer, such as a disper, or a disperser, such as a bead mill, to obtain a coating material containing dispersed microparticles 13. During this process, a photostabilizer, a UV absorber, an antistatic agent, a flame retarder, an antioxidant, and the like may be added as necessary. Silica microparticles may further be added as a viscosity adjustor.

An organic solvent that dissolves the resin material used, has good wettability with the microparticles 13, and does not bleach the base member 11 can be used as the solvent, for example. Examples of the organic solvent include ternary butanol, isopropyl acetate, and the like.

The resin preferably contains 3 wt % or more and 20 wt % or less polymer and 80 wt % or more and 97 wt % or less oligomer and/or monomer, and more preferably contains 5 wt % or more and 15 wt % or less polymer and 85 wt % or more and 95 wt % or less oligomer and/or monomer relative to the total amount of resin. The polymer is added to adjust cure shrinkage. At a polymer content less than 3 wt %, the cure shrinkage is large, and this increases roughness of the surface, increases the root-mean-square slope RΔq and the arithmetic mean roughness Ra, and thus increases the cloudiness degree. In contrast, if an excessive amount of polymer is added in an amount more than 20 wt %, the percentage of the material that obstructs curing in the resin increases and the viscosity of the coating material increases. As a result, the dispersibility of the microparticles 13 is degraded, and the parts where microparticles 13 are sparse and the parts where microparticles 13 are dense become clearly distinguishable to an unnecessary degree. As a result, the difference in cure shrinkage notably appears between the dense and sparse portions and the cloudiness degree is increased. Moreover, when an excessive amount (more than 20 wt %) of polymer is added, the hardness of the antiglare layer 12 decreases significantly.

The Martens' hardness of the antiglare layer 12 is preferably 220 N/mm$^2$ or more. When the polymer content is more than 20 wt %, it is difficult to achieve a Martens' hardness of 220 N/mm$^2$ or more.

In this embodiment, Martens' hardness is determined by the following test method.

An antiglare layer 12 is formed on a base member 11. A portion where no microparticles 13 are present is selected and the surface hardness is measured by indentation testing under the following conditions:

Measuring instrument: PICODENTOR HM-500 (Fischer Instruments K.K.)

Indenter: Vickers indenter

Maximum indentation depth: 10% or less of the average thickness of the antiglare layer The resin is preferably an ionizing radiation-curable resin that can be cured by UV or electron beams or a thermosetting resin that can be cured by heat from the viewpoint of ease of manufacture. A photosensitive resin that can be cured with UV light is most preferred. Examples of the photosensitive resin include acrylate resins such as urethane acrylate, epoxy acrylate, polyester acrylate, polyol acrylate, polyether acrylate, and melamine acrylate. A resin that exhibits good light-transmitting property and high hardness after being cured are particularly preferred to achieve good image-transmitting property and tolerance to damage. Such a resin can be appropriately selected. The ionizing radiation-curable resin is not particularly limited to UV-curable resins, and any ionizing radiation-curable resin that has light-transmitting property can be used. However, a resin that does not cause significant changes in the hue of transmitted light and the quantity of transmitted light due to coloring and haze is preferred.

Such a photosensitive resin can be obtained by blending an photopolymerization initiator with organic materials, such as monomers, oligomers, and polymers, that can be used to form the resin. For example, a urethane acrylate resin is obtained by reacting a polyester polyol with an isocyanate monomer or a prepolymer and then allowing the resulting reaction product to react with a hydroxyl-containing acrylate or methacrylate monomer.

Examples of the photopolymerization initiator contained in the photosensitive resin include benzophenone derivatives, acetophenone derivatives, and anthraquinone derivatives. These may be used alone or in combination. A component that improves film formation, such as an acryl resin, may be selected and blended in the photosensitive resin.

The photosensitive resin may be mixed with a urethane resin, an acryl resin, a methacryl resin, a styrene resin, a melamine resin, or a cellulose resin that can be affixed at least by drying, an ionizing radiation-curable oligomer, or a thermosetting oligomer. The hardness and curling of the antiglare layer 12 can be adjusted by adequately mixing such resins. These resins are merely examples and are not limiting. Preferably, a polymer that has an ionizing radiation-curable functional group, such as an acryl double bond, or a thermosetting group, such as —OH group, is used.

As for the coating material prepared as such, the difference in specific gravity between the microparticles 13 and the liquid component in the coating material is preferably adjusted before the application process so that the microparticles 13 can be adequately settled and/or aggregated. This is because desired fine asperities including low-angle reflecting portions having relatively low slope angles and wide-angle reflecting portions having large slopes can be formed in the surface of the film formed by application upon completion of the application. Preferably, the difference in surface tension between the microparticles 13 and the solvent is adjusted. This is to control the distribution of the microparticles 13 in the course of drying the resin.

Application

Next, the coating material obtained as above is applied on the base member 11. The coating material is applied so that the average film thickness after drying is preferably 6.4 µm or more and 18 µm or less, more preferably 8 µm or more and 16 µm or less, and most preferably 11 µm or more and 13 µm or less. This is because sufficient hardness is not achieved at an excessively small average film thickness. In contrast, at an excessively large average film thickness, curling occurs in the course curing the resin during manufacture.

The application technique is not particularly limited and any widely available application technique can be employed. Examples of the widely available application techniques include micro gravure coating technique, a wire bar coating technique, a direct gravure coating technique, a die coating technique, a dipping technique, a spray coating technique, a reverse roll coating technique, a curtain coating technique, a comma coating technique, a knife coating technique, and a spin-coating technique.

Drying and Curing

After application of the coating material, the applied coating material is dried and cured to obtain an antiglare layer 12. During this process, an asperity that has a longer period and a gentle profile, i.e., a root-mean-square slope RΔq that is adequately small, compared to the related art is formed in the surface of the antiglare layer 12. Instead of homogeneously dispersing the microparticles 13, the microparticles 13 are intentionally distributed so that dense portions and sparse portions are created by the convections that occur during drying. A portion in which the microparticles 13 are gathered closely forms one peak. A surface profile with gentle, smooth waviness is thereby formed. The drying temperature and the drying time can be adequately determined by the boiling point of the solvent contained in the coating material. In such a case, the drying temperature and the drying time are preferably set by considering the heat resistance of the base member 11 and are thus preferably in the ranges that do not cause deformation of the base member 11 by thermal shrinkage.

The drying step and curing step will now be specifically described.

First, the coating material applied on the base member 11 is dried at a particular temperature to generate convections in the coating material and to distribute the microparticles 13 densely in some parts and sparsely in other parts by the convections.

The extent to which the microparticles 13 are distributed with varying densities may be adjusted by appropriately controlling the surface tension of the solvent and the surface energy of the microparticles 13, for example. The drying temperature and the drying time can be adequately selected on the basis of the boiling point of the solvent contained in the coating material. In such a case, the drying temperature and the drying time are preferably set by considering the heat resistance of the base member 11 and are thus preferably in the ranges that do not cause deformation of the base member 11 by thermal shrinkage.

The drying conditions are not particularly limited. The coating material may be dried naturally or artificially by controlling the drying temperature, the drying time, etc. However, in the case where the coating material surface is exposed to wind during drying, it is preferable to prevent wind ripples in the film surface. When wind ripples are created, the desired gently wavy asperity tends to be difficult to achieve in the surface of the antiglare layer, and it thus becomes difficult to achieve both the antiglare property and the contrast.

Next, the dried resin on the base member 11 is cured by irradiating with ionizing radiation or heating. As a result, the difference in cure shrinkage ratio between the portions where the microparticles 13 are sparse and the portions where the microparticles 13 are dense creates gentle peaks and valleys in the surface of the coating material. In other words, waviness having a large period is formed in which a portion where the microparticles 13 are densely gathered forms one peak. In other words, an asperity that has a longer period and a gentle profile compared to the related art is formed in the surface of the antiglare layer 12.

Examples of the ionizing radiation include an electron beam, a UV ray, a visible ray, and a gamma ray. A UV ray is preferred from the viewpoint of production equipment. Examples of the UV ray source include an ultrahigh pressure mercury lamp, a high-pressure mercury lamp, a low-pressure mercury lamp, a carbon arc, a xenon arc, and a metal halide lamp. The integrated dose is preferably adequately selected by considering the curing properties of the resin and suppression of yellowing of the resin and the base member 11. Examples of the atmosphere of irradiation include air, nitrogen, and an inert gas atmosphere such as argon.

As a result, a target antiglare film is obtained.

According to the first embodiment, the coating material containing the microparticles 13 and the resin is applied on the base member 11 and the coating material is dried so that the convections are generated in the coating material which distribute microparticles 13 densely in some parts and sparsely in other parts and the coating material in which the microparticles 13 are distributed as such is cured. The resin contains 3 wt % or more and 20 wt % or less polymer relative to the total amount of the resin. The average diameter of the microparticles 13 is 2.4 µm or more and 8 µm or less. The average thickness of the antiglare layer 12 is 6.4 µm or more and 18 µm or less. Thus, an antiglare film that has a high contrast and good antiglare property can be achieved.

2. Second Embodiment

2.1. Structure of Antiglare Film

Figure 6:
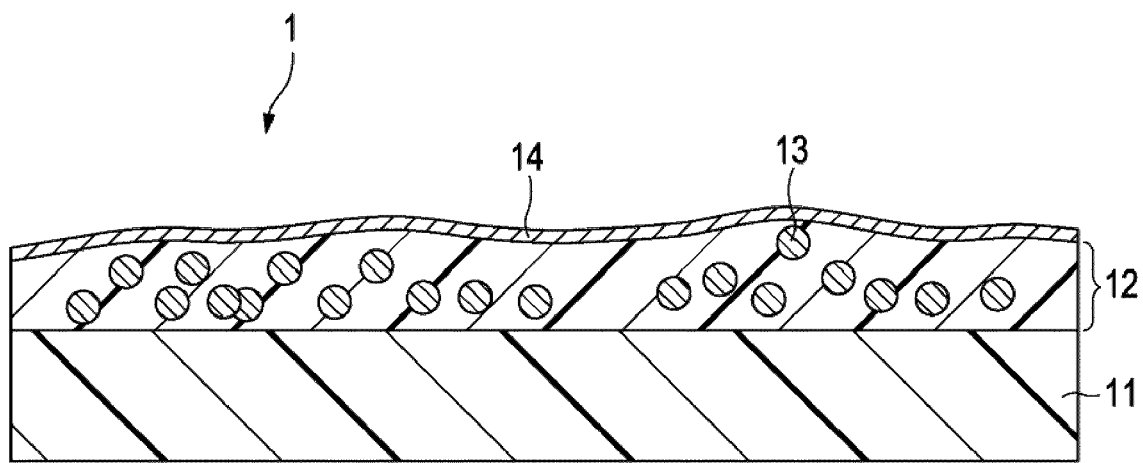
FIG. 6 is an enlarged cross-sectional view showing one example of a structure of an antiglare film according to a second embodiment.

FIG. 6 shows one example of a structure of an antiglare film according to a second embodiment. As shown in FIG. 6, an antiglare film 1 of the second embodiment differs from the first embodiment in that a low-refractive-index layer 14 is further provided on an antiglare layer 12. Since a base member 11 and the antiglare layer 12 are the same as those in the first embodiment, they are represented by the same reference characters and description therefor is omitted to avoid redundancy.

As shown in FIG. 6, the low-refractive-index layer 14 is preferably provided to follow the waviness in the antiglare layer surface. More preferably, the low-refractive-index layer 14 has a substantially uniform thickness and gentle surface waviness substantially identical to that of the surface of the antiglare layer 12. According to this arrangement, both contrast and antiglare property can be achieved even when the low-refractive-index layer 14 is provided. It should be noted that, although it is ideal that the low-refractive-index layer 14 have a substantially uniform thickness, the low-refractive-index layer 14 need not be provided over the entire region of the antiglare layer 12. A sufficient contrast can be achieved if the low-refractive-index layer 14 is substantially uniformly formed over the major portions of the antiglare layer 12 excluding the protruding parts, i.e., over relatively flat, smooth portions with a high reflectance.

Figure 7:
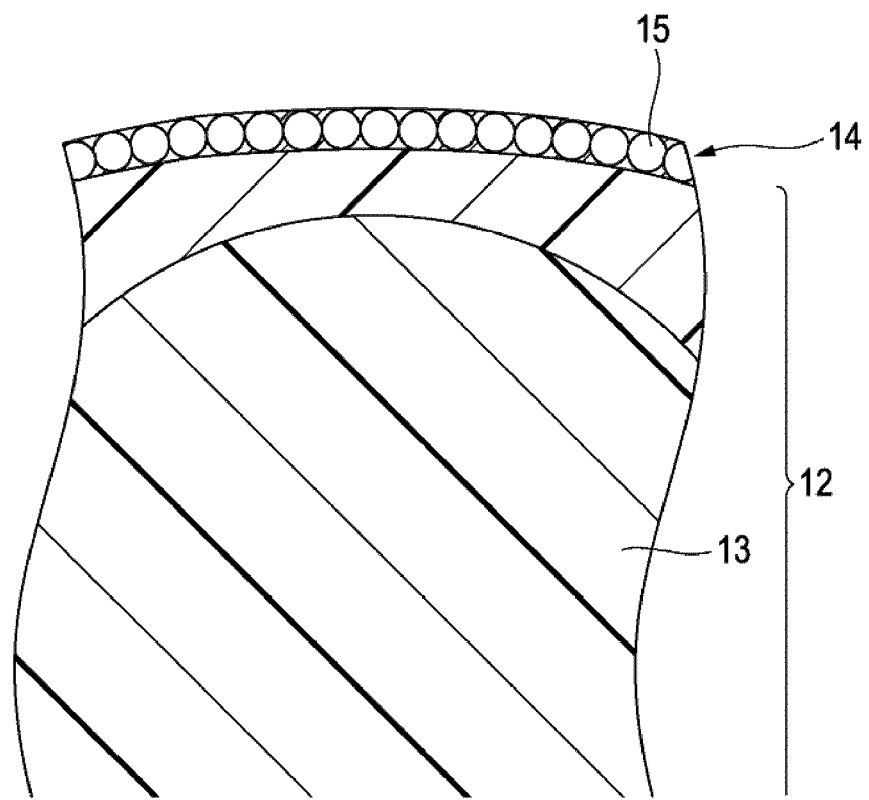
FIG. 7 is an enlarged cross-sectional view of a low-refractive-index layer shown in FIG. 6.

FIG. 7 is an enlarged cross-sectional view of the low-refractive-index layer 14 shown in FIG. 6. As shown in FIG. 7, the low-refractive-index layer 14 includes, for example, a resin and hollow microparticles 15. The hollow microparticles 15 are preferably dispersed over the entire surface of the antiglare layer 12. The hollow microparticles 15 are preferably buried in the low-refractive-index layer 14 and the buried hollow microparticles 15 preferably form a layer of the hollow microparticles 15 in which about two to three hollow microparticles 15 are stacked in the thickness direction of the low-refractive-index layer 14.

2.2. Method for Making Antiglare Film

Next, one example of a method for making the antiglare film of the second embodiment is described. This method for making the antiglare film of the second embodiment differs from the first embodiment in that a step of forming the low-refractive-index layer 14 is conducted after the step of forming the antiglare layer 12. Accordingly, only the step of forming the low-refractive-index layer 14 is described below.

Preparation of Coating Material

The hollow microparticles 15, a resin, and a solvent are mixed in a stirrer, such as a disper, or a disperser, such as a bead mill, to prepare a coating material. If necessary, additives such as a photostabilizer, a UV absorber, an antistatic agent, a flame retarder, an antioxidant, and the like may be added.

An ionizing radiation-curable resin curable by irradiation with light or an electron beam and a thermosetting resin that can be cured by heat can be used as the resin either alone or in combination. From the viewpoint of ease of manufacturing, a photosensitive resin curable with UV irradiation is most preferred. The ionizing radiation-curable resin preferably contains 90% or more of a polyfunctional monomer. Examples of the polyfunctional monomer include esters of polyhydric alcohols and (meth)acrylic acid, e.g., ethylene glycol di(meth)acrylate, 1,4-dicyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(m-ath)acrylate, 1,2,3-cyclohexane tetramethacrylate, polyurethane polyacrylate, and polyester polyacrylate.

Examples of the hollow microparticles 15 include inorganic microparticles such as silica and alumina and organic microparticles such as styrene and acryl. Silica microparticles are particularly preferred. Since the hollow microparticles 15 contain air inside, their refractive index is lower than that of regular microparticles. For example, whereas the refractive index of silica microparticles is 1.46, the refractive index of hollow silica microparticles is 1.45 or less.

The average diameter of the hollow microparticles 15 is preferably 10 to 200 nm and more preferably 30 to 60 nm. When the average diameter exceeds 200 nm, the particles are not negligible compared to the visible wavelength, and thus the surface of the low-refractive-index layer 14 scatters light. As a result, the transparency is degraded and the display surface appears grayish. When the average diameter is less than 10 nm, the hollow microparticles 15 tend to aggregate easily. The hollow microparticles 15 such as hollow silica microparticles preferably have (meth)acryloyl groups polymerizable with an ionizing radiation at their surfaces to improve the compatibility with the resin.

Modified silicon acrylate compounds may be used as the additive, for example. Examples thereof include compounds having at least one organic group in a dimethyl silicon molecule. The equivalent of the organic groups bonded to dimethyl silicon is preferably 1630 g/mol or more. The organic group equivalent can be calculated by nuclear magnetic resonance (NMR) analysis from the peak intensity ratio of 1H of the methyl groups and 1H of the organic groups in the dimethyl silicon molecule. Examples of the organic group include a methacryl group, an acryl group, and a mercapto group.

A solvent that dissolves the resin to be used but not the underlying antiglare layer 12 is preferred as the solvent. Examples of such a solvent include organic solvents such as tertiary butanol, toluene, methyl ethyl ketone (MEK), isopropyl alcohol (IPA), and methyl isobutyl ketone (MIBK).

Application

Next, the coating material obtained as above is applied on the antiglare layer 12. Examples of the technique for applying the coating material include gravure coating, bar coating, die coating, knife coating, comma coating, spray coating, and curtain coating. The coating technique is not limited to those described above and any technique that can apply a designated amount of coating material with a uniform thickness can be used.

Drying and Curing

Next, the coating material applied on the antiglare layer 12 is dried and cured. As a result, a low-refractive-index layer 14 with a gentle asperity is formed on the antiglare layer 12. The drying and curing methods can be the same as those used in the process of making the antiglare layer of the first embodiment described above. As a result, a target antiglare film 1 is obtained.

According to the second embodiment, since the low-refractive-index layer 14 is provided on the antiglare layer 12, the reflectance can be further decreased compared to the first embodiment.

3. Third Embodiment

In a third embodiment, an optical film used as an antiglare film in the first embodiment is used as an "anti-Newton-ring (ANR) film" (referred to as "ANR film" hereinafter).

Figure 8:
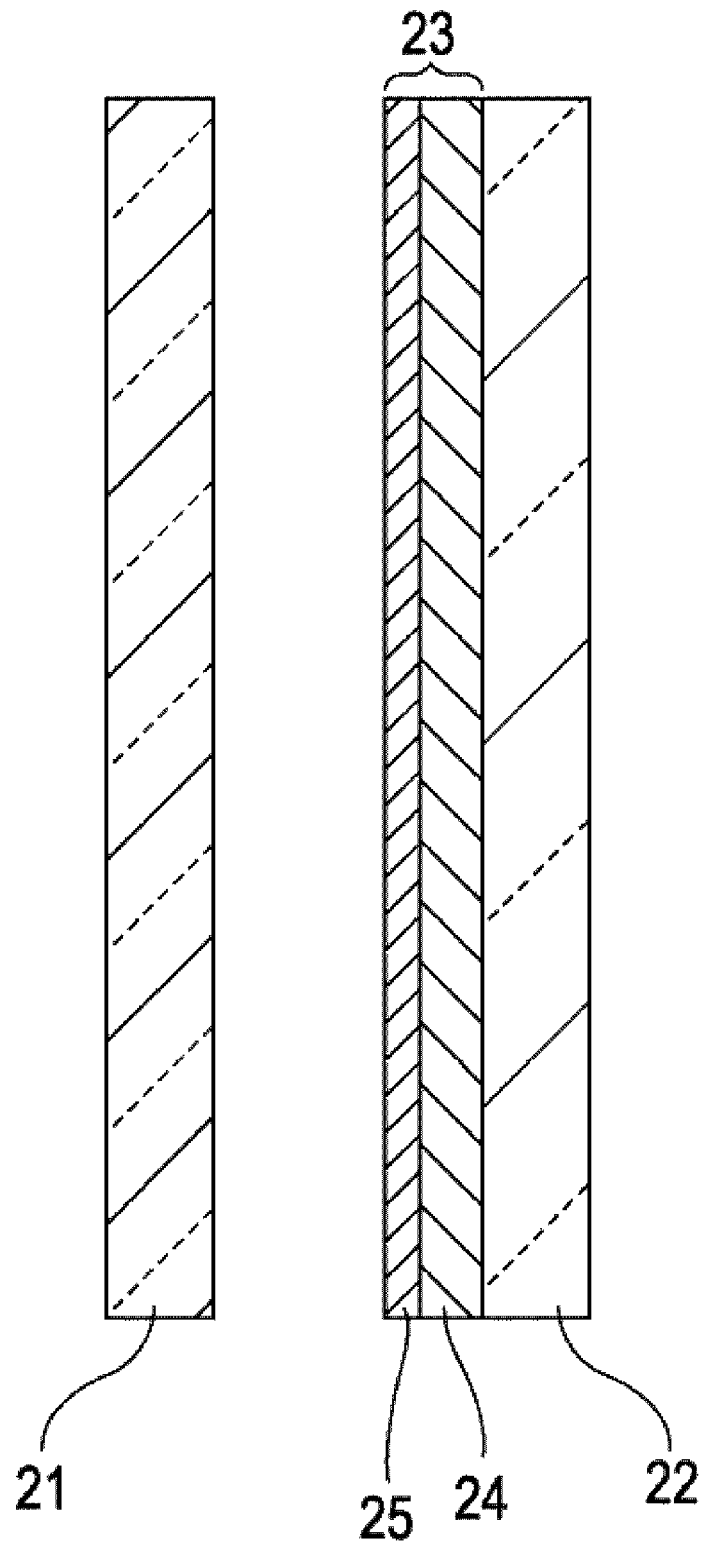
FIG. 8 is a schematic cross-sectional view showing an example structure of a display apparatus according to a third embodiment.
Figure 9:
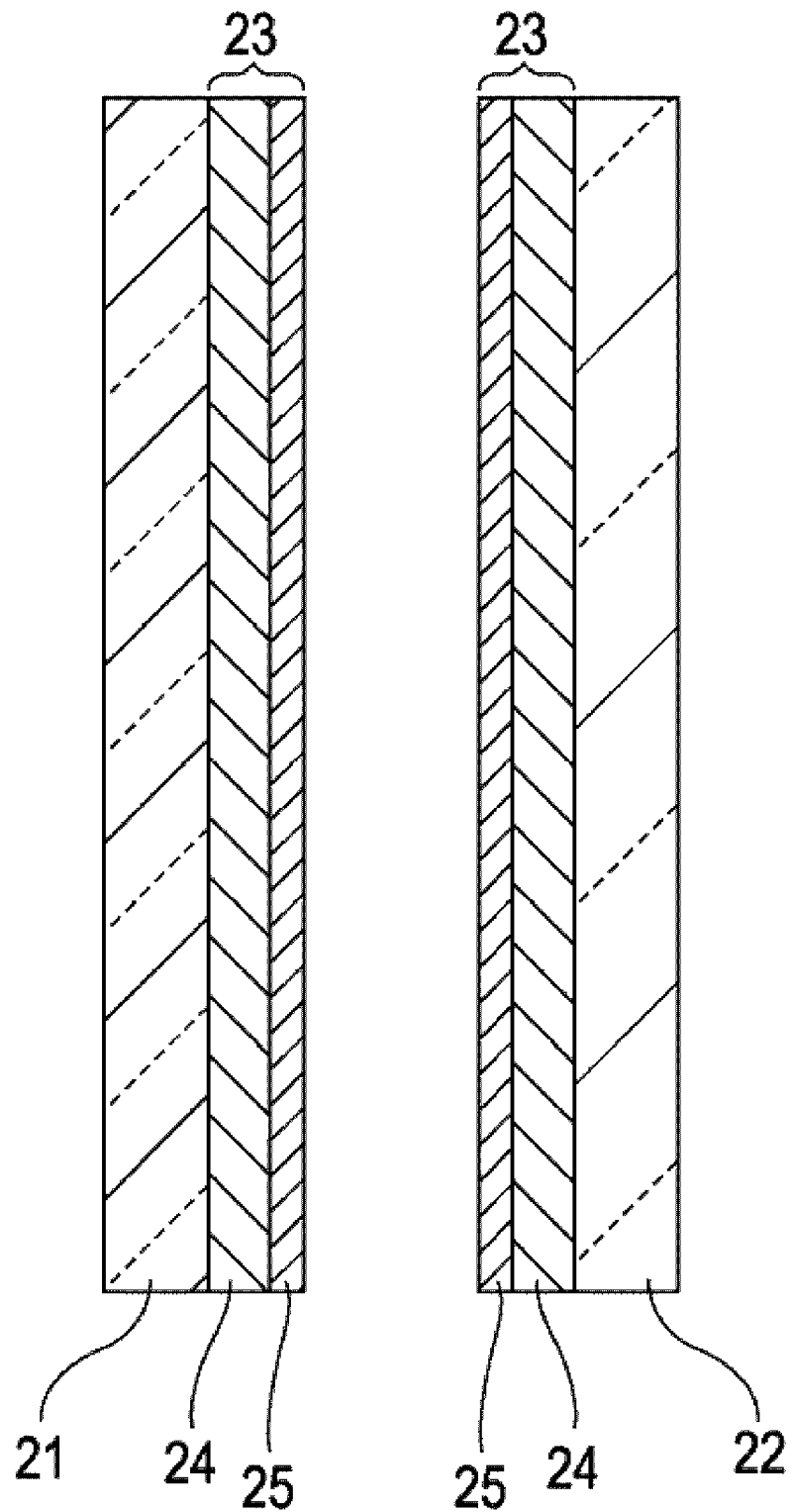
FIG. 9 is a schematic cross-sectional view showing another example structure of a display apparatus according to the third embodiment.

FIGS. 8 and 9 show examples of the structures of display apparatuses according to the third embodiment. Each display apparatus includes a display unit 21 and a front member 22 disposed in front of the display unit 21. An air layer is formed between the display unit 21 and the front member 22, for example. At least one of the front surface of the display unit 21 and the rear surface of the front member 22 is provided with an ANR film 23. To be more specific, FIG. 8 shows an example of a display apparatus that has an ANR film 23 on the rear surface of the front member 22. FIG. 9 shows an example of a display apparatus that has ANR films 23 on the front surface of the display unit 21 and the rear surface of the front member 22, respectively. In order to suppress occurrence of Newton's rings, both the display surface of the display unit 21 and the rear surface of the front member 22 are preferably provided with the ANR films 23. The ANR film 23 is bonded to the front member 22 or the display unit 21 with an adhesive or the like. In this embodiment, the "front surface" is the surface that serves as a display surface, i.e., the viewer's side surface, and the "rear surface" is the surface opposite the display surface.

Examples of the display unit 21 that can be used include liquid crystal displays, cathode ray tube (CRT) displays, plasma display panels (PDPs), organic electroluminescence (EL) displays, inorganic EL displays, surface-conduction electron-emitter displays (SEDs), and field emission displays (FEDs).

The front member 22 aims to provide mechanical, thermal, and weathering protections to and improve design of the front surface (viewer's side surface) of the display unit 21. The front member 22 is, for example, sheet-, film-, or plate-shaped. Examples of the material for the front member 22 include, but are not limited to, glass, triacetyl cellulose (TAC), polyesters (TPEE), polyethylene terephthalate (PET), polyimide (PI), polyamide (PA), aramid, polyethylene (PE), polyacrylate, polyethersulfone, polysulfone, polypropylene (PP), diacetyl cellulose, polyvinyl chloride, acryl resins (PMMA), and polycarbonate (PC). Any suitable material having transparency can be used.

Figure 10:
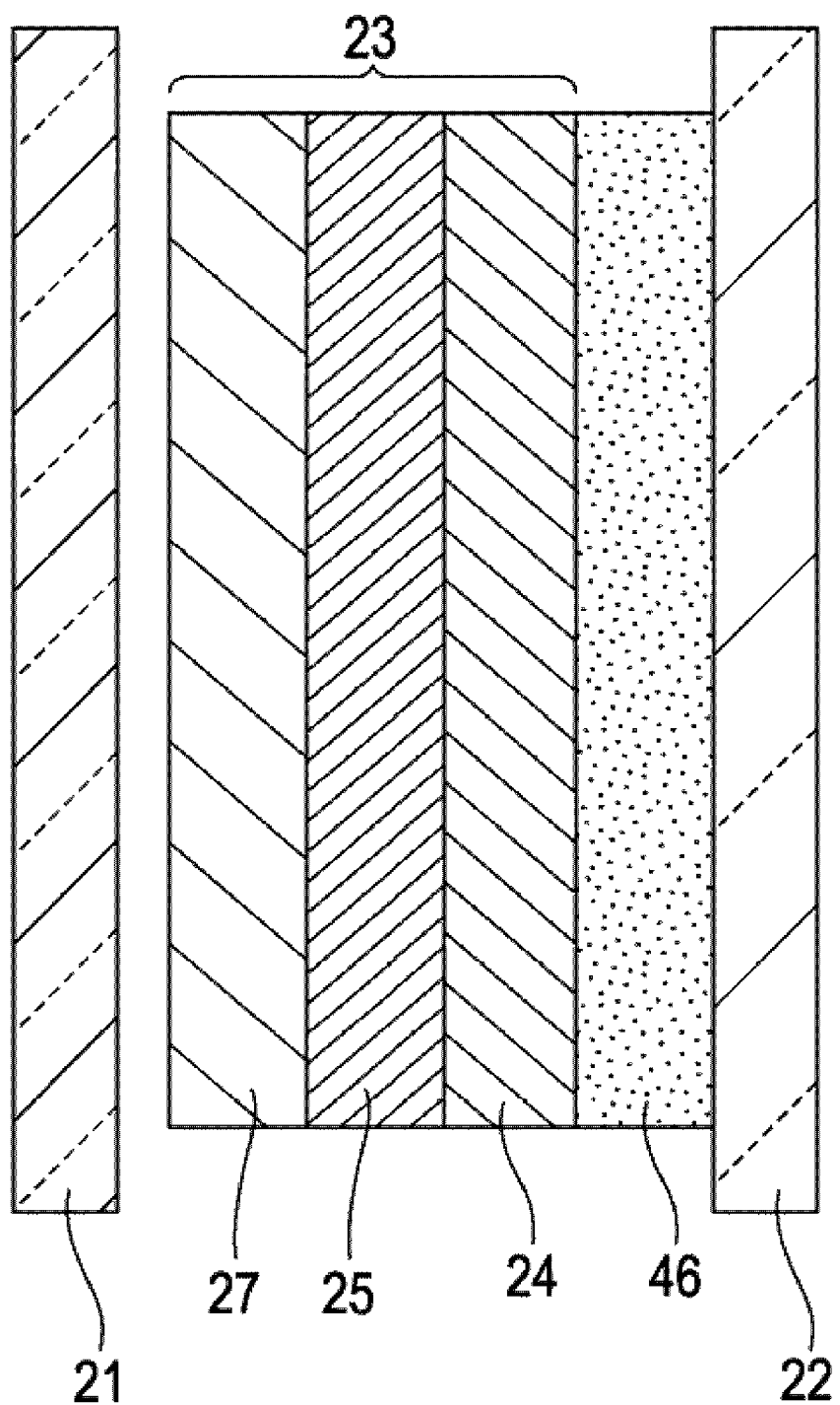
FIG. 10 is a schematic cross-sectional view showing one example of a structure of an anti-Newton ring (ANR) film according to the third embodiment.

FIG. 10 shows one example of a structure of an ANR film 23. The ANR film 23 suppresses occurrence of Newton's rings in the display apparatus. As shown in FIG. 10, the ANR film 23 includes a base member 24 and an ANR layer 25 disposed on the base member 24. The ANR film 23 is bonded onto an adherend such as the front member 22 with an adhesive layer 46. The adhesive layer 46 is mainly composed of an adhesive. An adhesive commonly used in the technical field pertaining to optical films can be used as the adhesive. For the purpose of this specification, tackiness agents such as pressure-sensitive adhesives (PSAs) are also considered as one type of adhesives.

A film identical to the antiglare film 1 of the first embodiment can be used as the ANR film 23. In particular, the base member 24 and the ANR layer 25 identical to the base member 11 and the antiglare layer 12 used in the first embodiment can be used.

As shown in FIG. 10, an anti-reflection (AR) layer 27 is preferably disposed on the ANR layer 25 to reduce the reflection. The AR layer 27 may be either a dry type or a wet type, but is preferably a wet type. An example of the wet-type AR layer 27 is a layer containing hollow microparticles used in the second embodiment.

According to the third embodiment, since the ANR film 23 is disposed at the front surface side of the display unit 21 and/or the rear surface side of the front member 22, the occurrence of Newton's rings is suppressed or reduced to a negligible level.

4. Fourth Embodiment

Figure 11:
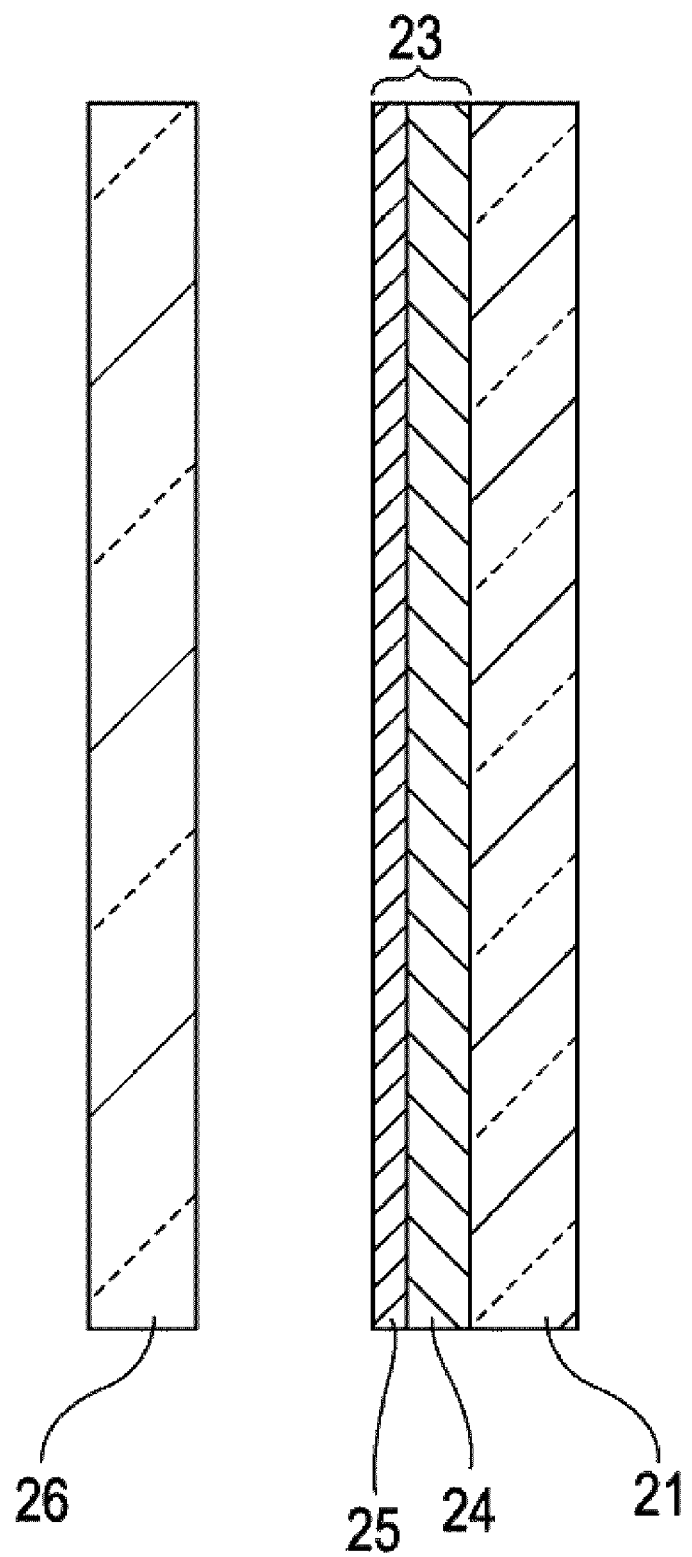
FIG. 11 is a schematic cross-sectional view showing an example structure of a display apparatus according to a fourth embodiment.
Figure 12:
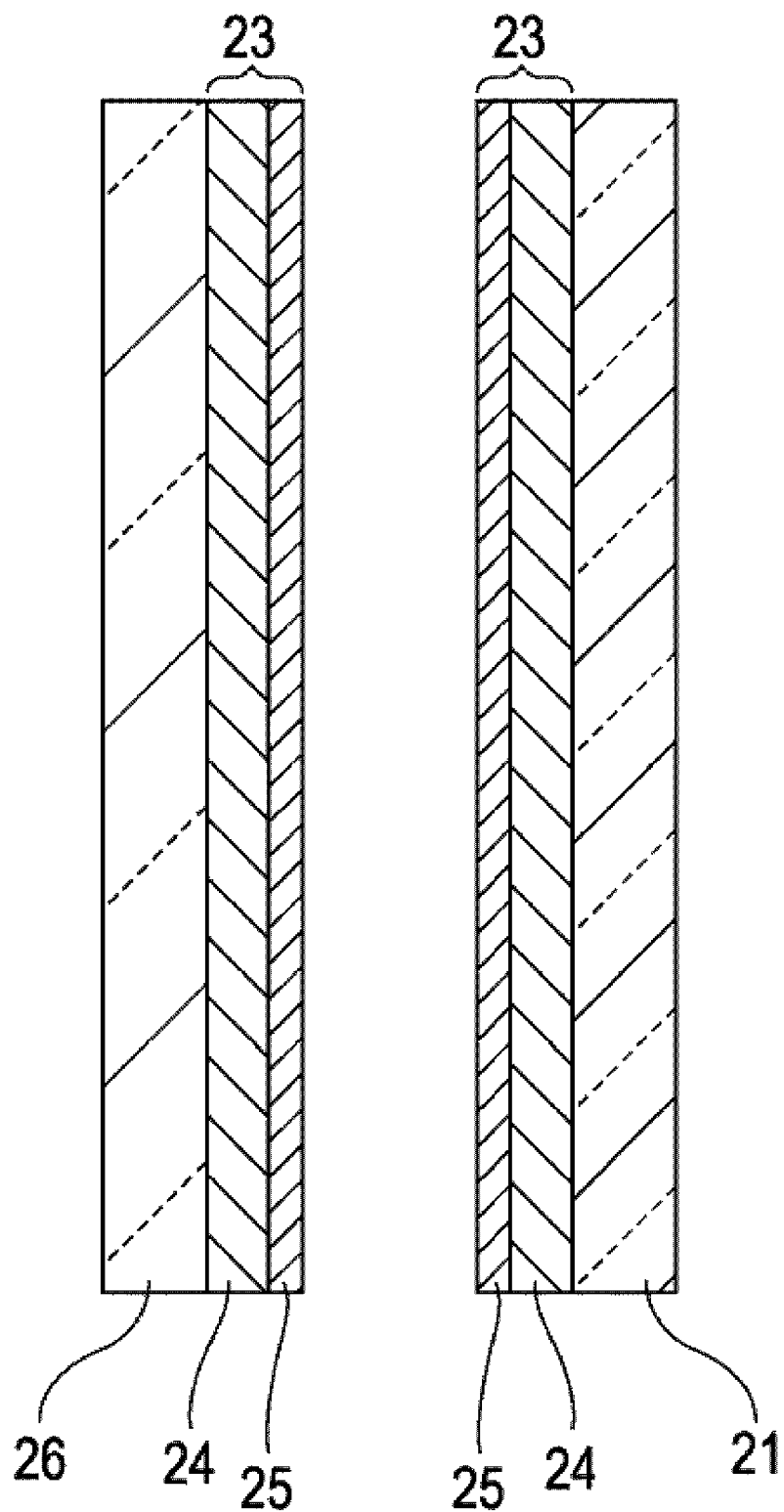
FIG. 12 is a schematic cross-sectional view showing another example structure of a display apparatus according to the fourth embodiment.

FIGS. 11 and 12 show examples of the structures of display apparatuses according to the fourth embodiment. The fourth embodiment differs from the third embodiment in that the display apparatus includes a display unit 21, a rear member 26 disposed at the rear surface side of the display unit 21, and an ANR film 23 at the rear surface side of the display unit 21 and/or the front surface side of the rear member 26.

To be more specific, FIG. 11 shows an example of a display apparatus that has an ANR film 23 on the rear surface of the display unit 21. FIG. 12 shows an example of a display apparatus that has ANR films 23 on the rear surface of the display unit 21 and on the front surface of the rear member 26, respectively. The same components as the third embodiment are referenced by the same reference characters and the description therefor is omitted to avoid redundancy.

The rear member 26 is, for example, sheet-, film-, or plate-shaped. When the display unit 21 is a liquid crystal display, the rear member 26 is, for example, a diffusing plate or sheet for making illuminance of light from the light source uniform in an in-plane direction, a lens film for controlling the viewing angle, a polarization separation reflection film configured to polarize and separate light from the light source for reuse, or the like.

According to the fourth embodiment, since the ANR film 23 is disposed at the rear surface side of the display unit 21 and/or the front surface side of the rear member 26, occurrence of Newton's rings is suppressed or reduced to a negligible level.

5. Fifth Embodiment

Figure 13:
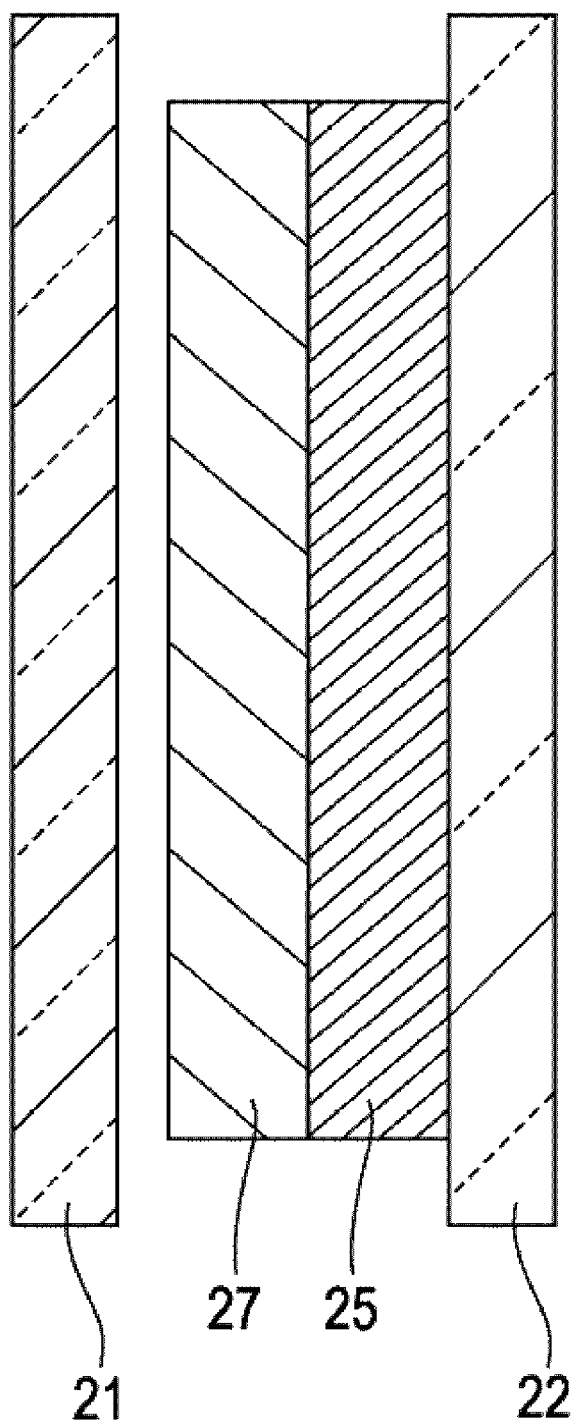
FIG. 13 is a schematic cross-sectional view showing one example of a structure of a display apparatus according to a fifth embodiment.

FIG. 13 shows one example of a structure of a display apparatus according to a fifth embodiment. The fifth embodiment differs from the fourth embodiment in that an ANR layer 25 is directly formed on the front surface side of the display unit 21 and/or the rear surface side of the front member 22 without using any adhesive. FIG. 13 shows an example in which the ANR layer 25 is directly formed on the rear surface of the front member 22. The same components as the third embodiment are referenced by the same reference characters and the description therefor is omitted to avoid redundancy.

In the fourth embodiment also, the ANR layer 25 may be directly formed on the rear surface side of the display unit 21 and/or the front surface side of the rear member 26.

According to the fifth embodiment, since the ANR layer 25 is directly formed on the front surface side of the display unit 21 and/or the rear surface side of the front member 22, the structure of the display apparatus and the production process can be simplified compared to the fourth embodiment.

EXAMPLES

The embodiments will now be described in detail by way of Examples. However, these examples do not limit the scope of the present invention. In Examples, the average diameter of microparticles and the dry thickness of the antiglare layer were measured as follows.

Average Diameter of Microparticles

The average diameter of microparticles was determined by measuring the particle diameter with a Coulter multisizer and averaging the obtained data.

Dry Thickness of Antiglare Layer

The dry thickness (average thickness) of the antiglare layer was determined with a contact thickness meter (product of TESA K.K.) as follows. First, a cylindrical probe having a diameter of 6 mm was brought to contact the antiglare layer at such a low load that the antiglare layer remains unbroken. Measurement was taken at arbitrary five points and the average value DA of the total antiglare film thickness was determined. The thickness of the uncoated portion of the same base member was measured, and the thickness DB of the base member was determined. The difference between the average value DA and the thickness DB of the base member was assumed to be the thickness of the antiglare layer. In the case where the uncoated portion is not available, it is possible to measure the thickness of the base member by preparing a cross-section of the antiglare film by a microtome technique or the like. However, since this gives a microscopic thickness, it is preferable to determine the thickness as the average film thickness as described earlier.

Example 1

The materials shown in the coating material composition below were blended and the resulting mixture was stirred with a magnetic stirrer for 1 hour to obtain a coating material. The obtained coating material was applied on a TAC film (Fujifilm Corporation) having a thickness of 80 µm with a bar coater. The applied coating material was dried for 2 minutes in a dry furnace at 80° C. and irradiated with UV light at 1 J/cm$^2$ to form an antiglare layer having a dry thickness of 13.4 µm. As a result, a target optical film was obtained.

<Coating Material Composition>

Hexafunctional urethane acryl oligomer: 90 parts by weight
  Acryl polymer: 10 parts by weight
  Initiator: Irgacure 184, 5 parts by weight
  Solvent: butyl acrylate, 55 parts by weight
  dimethyl carbonate, 45 parts by weight
  Silicon leveling agent: 0.05 parts by weight
  Crosslinking acryl-styrene copolymer microparticles (Techpolymer produced by Sekisui Plastics Co., Ltd., refractive index: 1.505, average diameter: 5.5 µm, coefficient of variation: 8): 10 parts by weight Example 2

An optical film having an antiglare layer with an average thickness of 10.2 µm was obtained as in Example 1 except that the microparticles below were added in the amount described below.

Crosslinking acryl-styrene copolymer microparticles (Techpolymer produced by Sekisui Plastics Co., Ltd., refractive index: 1.510, average diameter: 4.5 µm, coefficient of variation: 8): 10 parts by weight Example 3

An optical film having an antiglare layer with an average thickness of 12.1 µm was obtained as in Example 1 except that the microparticles below were added in the amount described below.

Crosslinking acryl-styrene copolymer microparticles (Techpolymer produced by Sekisui Plastics Co., Ltd., refractive index: 1.515, average diameter: 5.5 µm, coefficient of variation: 8): 10 parts by weight Example 4

An optical film having an antiglare layer with an average thickness of 13 µm was obtained as in Example 1 except that the microparticles below were added in the amount described below.

Crosslinking acryl-styrene copolymer microparticles (Techpolymer produced by Sekisui Plastics Co., Ltd., refractive index: 1.525, average diameter: 5.0 µm, coefficient of variation: 8): 10 parts by weight Example 5

An optical film having an antiglare layer with an average thickness of 13 µm was obtained as in Example 1 except that the microparticles below were added in the amount described below.

Crosslinking acryl-styrene copolymer microparticles (Techpolymer produced by Sekisui Plastics Co., Ltd., refractive index: 1.535, average diameter: 5.0 µm, coefficient of variation: 8): 10 parts by weight Example 6

An optical film having an antiglare layer with an average thickness of 6.4 µm was obtained as in Example 1 except that the microparticles below were added in the amount described below.

Crosslinking acryl-styrene copolymer microparticles (Techpolymer produced by Sekisui Plastics Co., Ltd., refractive index: 1.510, average diameter: 4.5 µm, coefficient of variation: 8): 10 parts by weight Example 7

An optical film having an antiglare layer with an average thickness of 8.8 µm was obtained as in Example 1 except that the microparticles below were added in the amount described below.

Crosslinking acryl-styrene copolymer microparticles (Techpolymer produced by Sekisui Plastics Co., Ltd., refractive index: 1.510, average diameter: 5.0 µm, coefficient of variation: 8): 10 parts by weight Example 8

An optical film having an antiglare layer with an average thickness of 18 µm was obtained as in Example 1 except that the resin and the microparticles below were added in amounts described below.

Hexafunctional urethane acryl oligomer: 87 parts by weight

Acryl polymer: 13 parts by weight

Crosslinking acryl-styrene copolymer microparticles (Techpolymer produced by Sekisui Plastics Co., Ltd., refractive index: 1.515, average diameter: 5.5 μm, coefficient of variation: 8): 25 parts by weight Example 9

An optical film having an antiglare layer with an average thickness of 11 μm was obtained as in Example 1 except that the resin and the microparticles below were added in amounts described below.

Hexafunctional urethane acryl oligomer: 97 parts by weight

Acryl polymer: 3 parts by weight

Crosslinking acryl-styrene copolymer microparticles (Techpolymer produced by Sekisui Plastics Co., Ltd., refractive index: 1.510, average diameter: 4.5 μm, coefficient of variation: 8): 15 parts by weight Example 10

An optical film having an antiglare layer with an average thickness of 11 μm was obtained as in Example 1 except that the resin and the microparticles below were added in amounts described below.

Hexafunctional urethane acryl oligomer: 80 parts by weight

Acryl polymer: 20 parts by weight

Crosslinking acryl-styrene copolymer microparticles (Techpolymer produced by Sekisui Plastics Co., Ltd., refractive index: 1.510, average diameter: 4.5 μm, coefficient of variation: 8): 15 parts by weight Example 11

An optical film having an antiglare layer with an average thickness of 8.1 μm was obtained as in Example 1 except that the microparticles below were added in the amount described below.

Crosslinking acryl-styrene copolymer microparticles (Techpolymer produced by Sekisui Plastics Co., Ltd., refractive index: 1.535, average diameter: 2.5 μm, coefficient of variation: 8): 15 parts by weight Example 12

An optical film having an antiglare layer with an average thickness of 14.3 μm was obtained as in Example 1 except that the resin and the microparticles below were added in amounts described below.

Hexafunctional urethane acryl oligomer: 95 parts by weight

Acryl polymer: 5 parts by weight

Crosslinking acryl-styrene copolymer microparticles (Techpolymer produced by Sekisui Plastics Co., Ltd., refractive index: 1.515, average diameter: 8.0 μm, coefficient of variation: 8): 30 parts by weight Example 13

An optical film having an antiglare layer with an average thickness of 8 μm was obtained as in Example 1 except that the microparticles below were added in the amount described below.

Crosslinking acryl-styrene copolymer microparticles (Techpolymer produced by Sekisui Plastics Co., Ltd., refractive index: 1.515, average diameter: 5.5 μm, coefficient of variation: 8): 10 parts by weight Example 14

An optical film having an antiglare layer with an average thickness of 12 μm was obtained as in Example 1 except that the microparticles below were added in the amount described below.

Crosslinking acryl-styrene copolymer microparticles (produced by Soken Chemical & Engineering Co., Ltd., refractive index: 1.515, average diameter: 5.0 μm, coefficient of variation: 8): 10 parts by weight Example 15

An optical film was obtained as in Example 1 except that the microparticles below were added in an amount described below.

Crosslinking acryl-styrene copolymer microparticles (Techpolymer produced by Sekisui Plastics Co., Ltd., refractive index: 1.525, average diameter: 5.0 μm, coefficient of variation: 8): 10 parts by weight Next, a low-refractive-index coating material composed of hollow silica was applied by a bar coater to a thickness of 120 nm on the obtained optical film and then cured. As a result, a low-refractive-index layer (reflection preventing coating) was formed on the optical film. As a result, a target optical film was obtained.

Example 16

An optical film having an antiglare layer with an average thickness of 14.5 μm was obtained as in Example 1 except that the microparticles below were added in the amount described below.

Crosslinking acryl-styrene copolymer microparticles (Techpolymer produced by Sekisui Plastics Co., Ltd., refractive index: 1.510, average diameter: 4.5 μm, coefficient of variation: 8): 10 parts by weight Example 17

An optical film having an antiglare layer with an average thickness of 9.0 μm was obtained as in Example 1 except that the microparticles below were added in the amount described below.

Crosslinking acryl-styrene copolymer microparticles (Techpolymer produced by Sekisui Plastics Co., Ltd., refractive index: 1.525, average diameter: 6 μm, coefficient of variation: 8): 9 parts by weight Example 18

An antiglare film was obtained as in Example 1. Next, a low-refractive-index coating material composed of hollow silica was applied by a bar coater to a thickness of 120 nm on the obtained antiglare film and then cured. As a result, a low-refractive-index layer (reflection preventing coating) was formed on the antiglare film. As a result, a target optical film was obtained.

Comparative Example 1

An optical film having an antiglare layer with an average thickness of 18.2 μm was obtained as in Example 1 except that the resin and the microparticles below were added in amounts described below.

Hexafunctional urethane acryl oligomer: 95 parts by weight

Acryl polymer: 5 parts by weight

Acryl microparticles (Techpolymer produced by Sekisui Plastics Co., Ltd., refractive index: 1.495, average diameter: 8 μm, coefficient of variation: 8): 10 parts by weight Comparative Example 2

An optical film having an antiglare layer with an average thickness of 13 μm was obtained as in Example 1 except that the resin and the microparticles below were added in amounts described below.

Hexafunctional urethane acryl oligomer: 95 parts by weight

Acryl polymer: 5 parts by weight

Crosslinking acryl-styrene copolymer microparticles (Techpolymer produced by Sekisui Plastics Co., Ltd., refractive index: 1.570, average diameter: 5.0 μm, coefficient of variation: 8): 9.4 parts by weight Comparative Example 3

An optical film having an antiglare layer with an average thickness of 5.2 μm was obtained as in Example 1 except that the microparticles below were added in the amount described below.

Crosslinking acryl-styrene copolymer microparticles (Techpolymer produced by Sekisui Plastics Co., Ltd., refractive index: 1.515, average diameter: 5.5 μm, coefficient of variation: 8): 10 parts by weight Comparative Example 4

An optical film having an antiglare layer with an average thickness of 19.6 μm was obtained as in Example 1 except that the resin and the microparticles below were added in amounts described below.

Hexafunctional urethane acryl oligomer: 95 parts by weight

Acryl polymer: 5 parts by weight

Crosslinking acryl-styrene copolymer microparticles (Techpolymer produced by Sekisui Plastics Co., Ltd., refractive index: 1.515, average diameter: 8 μm, coefficient of variation: 8): 30 parts by weight Comparative Example 5

An optical film having an antiglare layer with an average thickness of 11.5 μm was obtained as in Example 1 except that the resin and the microparticles below were added in amounts described below.

Hexafunctional urethane acryl oligomer: 100 parts by weight

Crosslinking acryl-styrene copolymer microparticles (Techpolymer produced by Sekisui Plastics Co., Ltd., refractive index: 1.510, average diameter: 4.5 μm, coefficient of variation: 8): 15 parts by weight Comparative Example 6

An optical film having an antiglare layer with an average thickness of 11.2 μm was obtained as in Example 1 except that the resin and the microparticles below were added in amounts described below.

Hexafunctional urethane acryl oligomer: 75 parts by weight

Acryl polymer: 25 parts by weight

Crosslinking acryl-styrene copolymer microparticles (Techpolymer produced by Sekisui Plastics Co., Ltd., refractive index: 1.510, average diameter: 4.5 μm, coefficient of variation: 8): 15 parts by weight Comparative Example 7

An optical film having an antiglare layer with an average thickness of 8 μm was obtained as in Example 1 except that the microparticles below were added in the amount described below.

Crosslinking acryl-styrene copolymer microparticles (Techpolymer produced by Sekisui Plastics Co., Ltd., refractive index: 1.515, average diameter: 1.8 μm, coefficient of variation: 8): 15 parts by weight Comparative Example 8

An optical film having an antiglare layer with an average thickness of 13.58 μm was obtained as in Example 1 except that the microparticles below were added in the amount described below.

Crosslinking acryl-styrene copolymer microparticles (Techpolymer produced by Sekisui Plastics Co., Ltd., refractive index: 1.515, average diameter: 8.0 μm, coefficient of variation: 8): 30 parts by weight Comparative Example 9

An optical film having an antiglare layer with an average thickness of 9.0 μm was obtained as in Example 1 except that the microparticles below were added in the amount described below.

Crosslinking acryl-styrene copolymer microparticles (Techpolymer produced by Sekisui Plastics Co., Ltd., refractive index: 1.495, average diameter: 6 μm, coefficient of variation: 8): 9 parts by weight The roughness, image clarity, total luminous transmittance, haze, cloudiness degree, antiglare property, Martens hardness and state of microparticles of antiglare films of Examples and Comparative Examples were evaluated as follows.

Roughness Evaluation

The surface roughness of the antiglare films of Examples and Comparative Examples was measured. A roughness profile was obtained from a two-dimensional primary profile, and the arithmetic mean roughness Ra, the root-mean-square slope RΔq of the roughness profile, and the mean width RSm of the roughness profile were calculated as roughness parameters. The results are shown in Tables 1 to 4. The measurement conditions complied with JIS B0601:2001. The measurement instruments and measurement conditions were as follows.

Measuring instrument: Full-automatic micro profiler, Surfcorder ET4000A (product of Kosaka Laboratory, Ltd.)

λc=0.8 mm, evaluation length: 4 mm, cutoff×5 data sampling interval: 0.5 μm

Image Clarity

To evaluate the clarity of transmitted fine-pitch images of the respective antiglare films of Examples and Comparative Examples, optical combs with a comb width of 2 mm, 1 mm, 0.5 mm, 0.25 mm, and 0.125 mm were used in accordance with JIS-K7105. Tables 1 to 3 show the sum of the transmitted image clarity measured with optical combs having a comb width of 2 mm, 1 mm, 0.5 mm, and 0.125 mm. The measurement instrument used for evaluation was an image clarity meter (ICM-IT type) produced by Suga Test Instruments Co., Ltd.

Total Luminous Transmittance and Haze

The total luminous transmittance, the surface haze, and the internal haze of the antiglare films of Examples and Comparative Examples were measured. The results are shown in Tables 1 to 4. The total haze is the sum of the surface haze and the internal haze.

Evaluation instrument: Haze meter HM-150 produced by Murakami Color Research Laboratory Co., Ltd.

Evaluation conditions:

total luminous transmittance, JIS K7136 haze, JIS K7136

In order to divide the haze of the optical film of each Example into the internal haze and the surface haze, a TAC film was bonded onto each film surface with an optical adhesive to measure the haze. The result was somehow greater than the haze of the optical film of Example alone, but the reason for this is not clear. In this respect, although the surface haze was negative values according to calculation, the negative surface haze was deemed to be zero in Examples. Experiments confirmed that the haze of the TAC with another TAC bonded on the surface with an optical adhesive was 0.5% or less.

Cloudiness Degree

The cloudiness degree of the antiglare films of Examples and Comparative Examples was measured. The results are shown in Tables 1 to 3. The cloudy feel occurs when the reflection scattered at the antiglare layer surface is sensed. Here, a commercially available spectrophotometer was used. The phenomenon described above was simulated and the quantified values were assumed to be the cloudiness degrees. Experiments confirmed that the cloudiness degree measured here is correlated with the cloudy feel observed with eye.

The specific measurement procedure for cloudiness degree is as follows. First, to suppress the influence of rear surface reflection and evaluate the diffused reflection of the antiglare film, a black acryl plate (Acrylite L 502 produced by Mitsubishi Rayon Co., Ltd.) was bonded to the rear surface of each antiglare film with an adhesive. Next, measurement was carried out with a portable sphere spectrophotometer, SP64, produced by X-Rite Inc., and a D65 light source in a d/8° optical system in which diffused light was applied to a specimen surface and the reflected light was measured with a detector positioned 8° askew from the specimen normal direction. The SPEX mode in which specular reflection components are removed and only the diffused reflection components are detected was employed for the measured values and the detection visual angle was 2°. In this manner, the ratio of the diffused reflection intensity to the light source intensity can be determined.

Antiglare Property

The antiglare property of the antiglare films of Examples and Comparative Examples was evaluated as follows. First, an antiglare film was bonded to a black acryl plate (A4 size) with an adhesive layer to prepare an evaluation sample. Then the antiglare film (plate) was held vertically at the height of the viewer's eyes in a 300 lux lighted room so that the face of the viewer was projected to the antiglare film. The distance between the antiglare film and the face of the viewer was 50 cm. The degree of glare of this reflected image was evaluated by the following standard. The results are shown in Tables 1 to 3.

A: Eyes of the reflected image were not recognizable.
B: Eyes were recognizable but their contours were blurred.
C: Eyes were directly recognizable.

Martens' Hardness

For the antiglare films of Examples and Comparative Examples, a portion where no microparticles were present was selected and the indentation hardness test was conducted under the following conditions. The results are shown in Tables 1 to 3.

Measuring instrument: PICODENTOR HM-500 (Fischer Instruments K.K.)

Indenter: Vickers indenter

Maximum indentation depth: 10% or less of the average thickness of the anti-glare layer State of Microparticles The state of distribution of organic microparticles of each of the antiglare films of Examples and Comparative Examples was observed with an optical microscope. The results are shown in Tables 1 to 3. It should be noted that samples in which organic microparticles are distributed densely in some parts and sparsely in other parts are rated "Good", and samples in which organic particles are substantially homogeneously distributed are rated "Poor".

The Observation Conditions were as Follows.

Figure 14A:
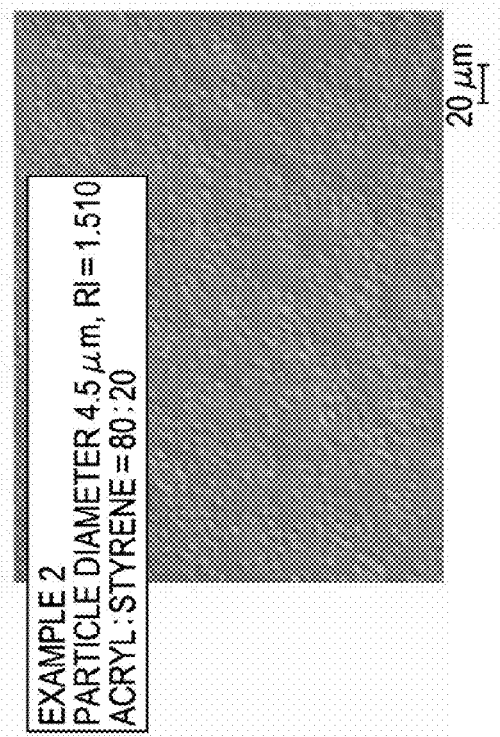
FIGS. 14A to 14D are surface photographs of antiglare films of Examples 1 to 4.
Figure 14B:
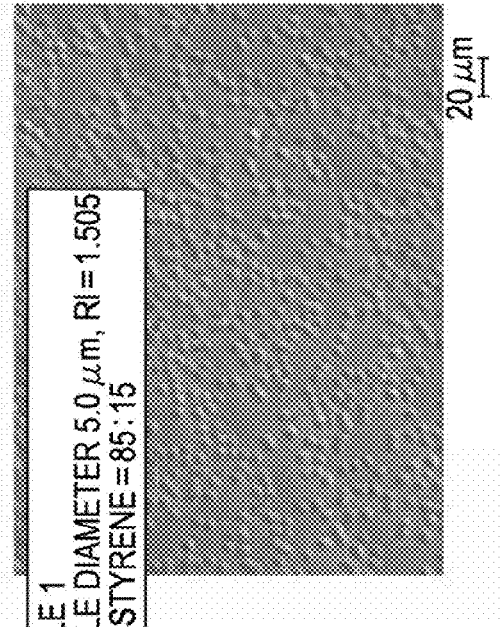
Figure 14C:
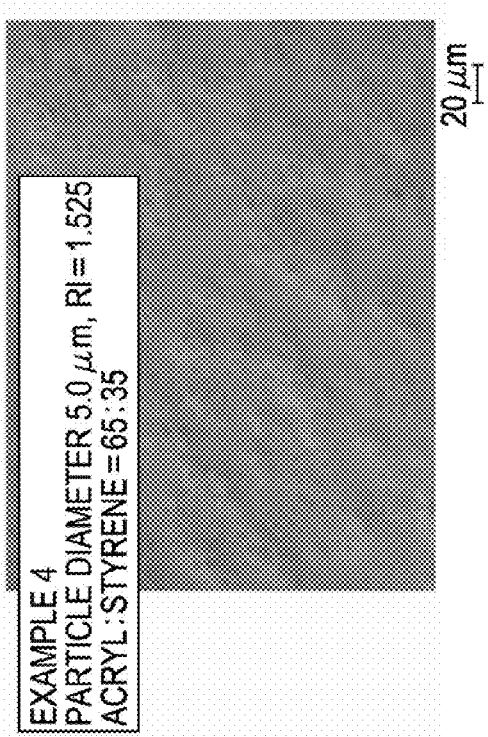
Figure 14D:
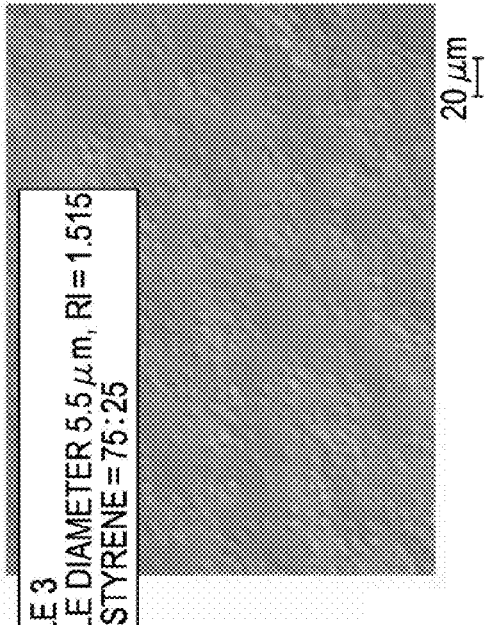
Figure 15:
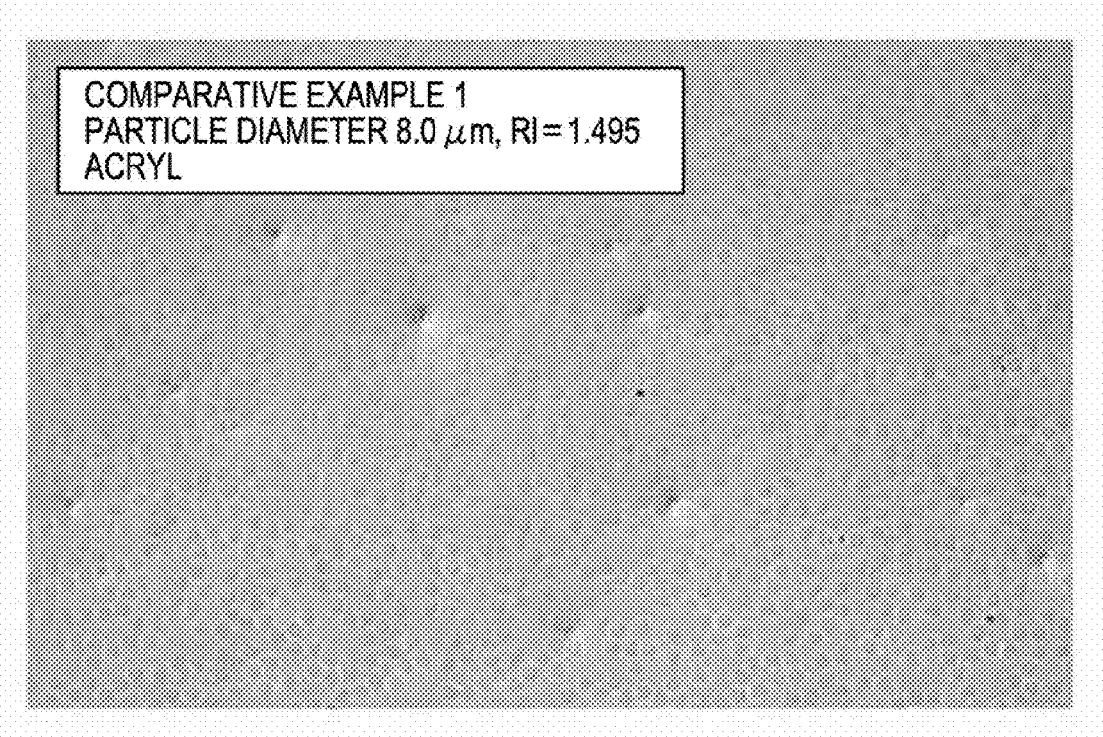
FIG. 15 is a surface photograph of an antiglare film of Comparative Example 1.

Observation conditions: Optical microscope BX51 produced by Olympus Corporation, 20 magnification, transmitted image Of Examples 1 to 18 and Comparative Examples 1 to 8, surface images of the antiglare films of Examples 1 to 4 and Comparative Example 1 are shown in FIGS. 14A to 15 as representative examples.

FIGS. 14A to 14D show that in Examples 1 to 4 in which the acryl/styrene copolymer microparticles are used, the microparticles are aggregated. In contrast, in Comparative Example 1 containing acryl microparticles, the microparticles are dispersed.

Newton's Ring

An antiglare film of each of Examples and Comparative Examples was placed on a black acryl plate with the antiglare layer surface in contact with the black acryl plate. Next, a 300 g/cm$^2$ load was imposed from the surface opposite the antiglare layer and whether Newton's rings occurred or not was observed with eye. The results are shown in Table 4.

TABLE 1

|  |  | Example 1 | Example 2 | Example 3 | Example 4 | Example 5 | Example 6 | Example 7 | Example 8 |
|---|---|---|---|---|---|---|---|---|---|
| Filler | Type | Acryl/styrene copolymer | Acryl/styrene copolymer | Acryl/styrene copolymer | Acryl/styrene copolymer | Acryl/styrene copolymer | Acryl/styrene copolymer | Acryl/styrene copolymer | Acryl/styrene copolymer |
|  | Refractive index | 1.505 | 1.510 | 1.515 | 1.525 | 1.535 | 1.510 | 1.510 | 1.515 |
|  | Difference in refractive index | 0.015 | 0.010 | 0.005 | −0.005 | −0.015 | 0.010 | 0.010 | 0.005 |
|  | Average particle diameter (μm) | 5 | 4.5 | 5.5 | 5 | 5 | 4.5 | 5 | 5.5 |

TABLE 1-continued

|  |  | Example 1 | Example 2 | Example 3 | Example 4 | Example 5 | Example 6 | Example 7 | Example 8 |
|---|---|---|---|---|---|---|---|---|---|
|  | Added amount (parts by weight) | 10 | 10 | 10 | 10 | 10 | 10 | 10 | 25 |
| Polymer | Added amount (parts by weight) | 10 | 10 | 10 | 10 | 10 | 10 | 10 | 13 |
| Structure | Layer | AG single | AG single | AG single | AG single | AG single | AG single | AG single | AG single |
|  | Thickness of AG layer (μm) | 13.4 | 10.2 | 12.1 | 13 | 13 | 6.4 | 8.8 | 18 |
| Ratio R (%) Diameter/thickness |  | 37.3 | 44.1 | 45.5 | 38.5 | 38.5 | 69.9 | 56.8 | 30.6 |
| Surface roughness | RΔq | 0.016 | 0.018 | 0.018 | 0.02 | 0.023 | 0.026 | 0.019 | 0.022 |
|  | Ra (μm) | 0.063 | 0.062 | 0.083 | 0.072 | 0.087 | 0.08 | 0.071 | 0.094 |
|  | RSm (mm) | 0.062 | 0.057 | 0.065 | 0.07 | 0.08 | 0.078 | 0.06 | 0.070 |
| Optical characteristics | Image clarity | 358.2 | 366.5 | 320.3 | 320.1 | 340 | 350 | 308.1 | 314.3 |
|  | Total luminous transmittance | 91.5 | 91.8 | 92 | 92.4 | 92 | 92 | 91.9 | 91.7 |
|  | Total haze | 12.7 | 6.2 | 3.3 | 1.3 | 2.3 | 3.6 | 1.83 | 5 |
|  | Internal haze | 13.7 | 6.9 | 4.4 | 0.58 | 0.6 | 4.2 | 0.38 | 5.5 |
|  | Cloudiness degree | 0.64 | 0.57 | 0.65 | 0.68 | 0.70 | 0.69 | 0.74 | 0.70 |
|  | AG property | A | A | A | A | A | A | A | A |
| Martens hardness (N/mm$^2$) |  | — | — | — | — | — | — | — | — |
| State of microparticles |  | Good | Good | Good | Good | Good | Good | Good | Good |

TABLE 2

|  |  | Example 9 | Example 10 | Example 11 | Example 12 | Example 13 | Example 14 | Example 15 | Example 16 |
|---|---|---|---|---|---|---|---|---|---|
| Filler | Type | Acryl/styrene copolymer | Acryl/styrene copolymer | Acryl/styrene copolymer | Acryl/styrene copolymer | Acryl/styrene copolymer | Acryl particles | Acryl/styrene copolymer | Acryl/styrene copolymer |
|  | Refractive index | 1.510 | 1.510 | 1.535 | 1.515 | 1.515 | 1.515 | 1.525 | 1.510 |
|  | Difference in refractive index | 0.010 | 0.010 | −0.015 | 0.005 | 0.005 | 0.005 | −0.005 | 0.010 |
|  | Average particle diameter (μm) | 4.5 | 4.5 | 2.5 | 8 | 5.5 | 5 | 5 | 4.5 |
|  | Added amount (parts by weight) | 15 | 15 | 15 | 30 | 10 | 10 | 10 | 10 |
| Polymer | Added amount (parts by weight) | 3 | 20 | 10 | 5 | 10 | 10 | 10 | 10 |
| Structure | Layer | AG single | AG single | AG single | AG single | AG single | AG single | AG + low refractive index layer | AG single |
|  | Thickness of AG layer (μm) | 11 | 11 | 8.1 | 14.3 | 8 | 12 | 11.0 | 14.5 |
| Ratio R (%) Diameter/thickness |  | 40.9 | 40.9 | 31.0 | 55.9 | 68.8 | 41.7 | 5.5 | 31.0 |
| Surface roughness | RΔq | 0.025 | 0.025 | 0.025 | 0.025 | 0.021 | 0.017 | 0.014 | 0.011 |
|  | Ra (μm) | 0.123 | 0.103 | 0.068 | 0.139 | 0.102 | 0.07 | 0.071 | 0.03 |
|  | RSm (mm) | 0.08 | 0.06 | 0.076 | 0.102 | 0.069 | 0.06 | 0.067 | 0.13 |
| Optical characteristics | Image clarity | 298.3 | 299.6 | 352 | 277 | 258 | 345 | 341.5 | 230 |
|  | Total luminous transmittance | 91.7 | 92 | 92 | 92.7 | 92 | 92.1 | 94.7 | 91.8 |
|  | Total haze | 6.4 | 3.4 | 7 | 2.6 | 2.1 | 3.2 | 4.7 | 11.1 |
|  | Internal haze | 8.1 | 4.8 | 7.8 | 2.7 | 4 | 4.2 | 4.8 | 12.4 |
|  | Cloudiness degree | 0.80 | 0.76 | 1.08 | 0.64 | 0.76 | 0.6 | 1.00 | 0.39 |
|  | AG property | A | A | B | A | A | A | A | A |
| Martens hardness (N/mm$^2$) |  | 305 | 242 | — | — | — | — | — | — |
| State of microparticles |  | Good | Good | Good | Good | Good | Good | Good | Good |

TABLE 3

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Filler | Type | Acryl particles | Acryl/styrene copolymer | Acryl/styrene copolymer | Acryl/styrene copolymer | Acryl/styrene copolymer | Acryl/styrene copolymer | Acryl/styrene copolymer | Acryl/styrene copolymer |
|  | Refractive index | 1.495 | 1.570 | 1.515 | 1.515 | 1.510 | 1.510 | 1.515 | 1.515 |
|  | Difference in refractive index | 0.025 | −0.050 | 0.005 | 0.005 | 0.010 | 0.010 | 0.005 | 0.005 |
|  | Average particle diameter (μm) | 8 | 5 | 5.5 | 8 | 4.5 | 4.5 | 1.8 | 8.5 |
|  | Added amount (parts by weight) | 10 | 9.4 | 10 | 30 | 15 | 15 | 15 | 30 |

TABLE 3-continued

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Polymer | Added amount (parts by weight) | 5 | 5 | 10 | 5 | 0 | 25 | 10 | 10 |
| Structure | Layer | AG single | AG single | AG single | AG single | AG single | AG single | AG single | AG single |
|  | Thickness of AG layer (μm) | 18.2 | 13 | 5.2 | 19.6 | 11.5 | 11.2 | 8 | 13.58 |
| Ratio R (%) | Diameter/thickness | 44.0 | 38.5 | 105.8 | 40.8 | 39.1 | 40.2 | 22.5 | 62.6 |
| Surface roughness | RΔq | 0.008 | 0.023 | 0.0315 | 0.02 | 0.036 | 0.033 | 0.031 | 0.0248 |
|  | Ra (μm) | 0.04 | 0.152 | 0.255 | 0.11 | 0.179 | 0.153 | 0.121 | 0.204 |
|  | RSm (mm) | 0.1 | 0.111 | 0.244 | 0.1 | 0.189 | 0.176 | 0.191 | 0.27 |
| Optical characteristics | Image clarity | 220 | 148 | 277.6 | 193.7 | 282.6 | 271.5 | 280 | 115.6 |
|  | Total luminous transmittance | 90 | 90.9 | 91.8 | 90.1 | 91.2 | 90.9 | 91 | 92 |
|  | Total haze | 12 | 13.8 | 4.3 | 36.4 | 6.5 | 5.6 | 2.7 | 2.7 |
|  | Internal haze | 11 | 11.6 | 5.3 | 38.8 | 8.2 | 7.6 | 2.9 | 2.8 |
|  | Cloudiness degree | 0.040 | 0.66 | 1.19 | 1.20 | 1.21 | 1.33 | 1.49 | 0.81 |
|  | AG property | C | B | A | B | A | A | B | A |
| Martens hardness (N/mm$^2$) |  | — | — | — | — | 307 | 219 | — | — |
| State of microparticles |  | Poor | Good | Good | Good | Good | Good | Good | Good |

TABLE 4

|  |  | Example 17 | Example 18 | Comparative Example 9 |
|---|---|---|---|---|
| Filler | Type | Acryl/styrene copolymer | Acryl/styrene copolymer | Acryl particles |
|  | Refractive index | 1.525 | 1.525 | 1.495 |
|  | Difference in refractive index | −0.005 | −0.005 | 0.025 |
|  | Average particle diameter (μm) | 6 | 6 | 6 |
|  | Added amount (parts by weight) | 9 | 9 | 9 |
| Polymer | Added amount (parts by weight) | 10 | 10 | 10 |
| Structure | Layer | AG single | AG + low refractive index layer | AG single |
|  | Thickness of AG layer (μm) | 9 | 9 | 9 |
| Ratio R (%) | Diameter/thickness | 66.7 | 66.7 | 66.7 |
| Surface roughness | RΔq | 0.0179 | 0.017 | 0.008 |
|  | Ra (μm) | 0.08 | 0.075 | 0.029 |
|  | RSm (mm) | 0.105 | 0.1 | 0.1 |
| Presence of ANR |  | None | None | Found |
| Internal haze |  | 1.0 | 1.0 | 11 |

The following can be understood from Tables 1 to 4.

In Examples 1 to 18, the difference in refractive index between the resin and the microparticles is 0 or more and 0.015 or less, the average diameter of microparticles is 2.4 μm or more and 8 μm or less, the polymer content in the resin is 3 wt % or more and 20 wt % or less, and the average thickness of the antiglare layer is 6.4 μm or more and 18 μm or less. Thus, the arithmetic mean roughness Ra is within the range of 0.03 μm to 0.15 μm and the root-mean-square slope RΔq is within the range of 0.01 to 0.03. Thus, the contrast and the antiglare property can be simultaneously achieved.

In Example 15, since a low-reflection layer is formed on the antiglare layer, a high total luminous transmittance can be achieved while maintaining good antiglare property when compared to Examples 1 to 14.

In Comparative Example 1, the difference in refractive index is outside the range of 0 to 0.015, and the dry thickness of the antiglare layer is outside the range of 8 to 18 μm. Thus the root-mean-square slope RΔq is outside the range of 0.01 to 0.03. Accordingly, good antiglare property is not achieved. Moreover, the image clarity is as poor as less than 230.

In Comparative Example 2, the difference in refractive index is outside the range of 0 to 0.015 and thus the arithmetic mean roughness Ra is outside the range of 0.03 to 0.15. Accordingly, good antiglare property is not obtained, the haze is high, and the surface haze derived from the difference between the total haze and the internal haze appears and causes cloudiness. Moreover, the image clarity is as poor as less than 230.

In Comparative Example 3, since the thickness is outside the range of 6.4 to 18 μm and the ratio R is outside the range of 30% to 70%, the arithmetic mean roughness Ra is outside the range of 0.03 to 0.15 and the root-mean-square slope RΔq is outside the range of 0.01 to 0.03. Thus, although good antiglare property is obtained, the cloudiness is increased.

In Comparative Example 4, since the thickness is outside the range of 6.4 to 18 μm, the total haze and the internal haze show significantly high values and the cloudiness is increased. Moreover, the image clarity is as poor as less than 230.

In Comparative Example 5, the polymer content is outside the range of 3 wt % to 20 wt %. Thus, the arithmetic mean roughness Ra is outside the range of 0.03 to 0.15 and the root-mean-square slope RΔq is outside the range of 0.01 to 0.03. Thus, although good antiglare property is obtained, the cloudiness degree is increased.

In Comparative Example 6, the polymer content is outside the range of 3 wt % to 20 wt %. Thus, the arithmetic mean roughness Ra is outside the range of 0.03 to 0.15 μm and the root-mean-square slope RΔq is outside the range of 0.01 to 0.03. Thus, although good antiglare property is obtained, the cloudiness degree is increased. Moreover, since the polymer content is excessively large, the Martens hardness is low compared to Examples 9 and 10 and Comparative Example 3.

In Comparative Example 7, the particle diameter is outside the range of 2.4 to 8 μm and the ratio R is outside the range of 30% to 70%. Thus, the root-mean-square slope RΔq is outside the range of 0.01 to 0.03. Although antiglare property is obtained, the cloudiness degree is increased.

In Comparative Example 8, since the particle diameter is outside the range of 2.4 to 8 μm, the arithmetic mean roughness Ra is outside the range of 0.03 to 0.15. Thus, although good antiglare property is obtained, the image clarity is as low as less than 230 due to large particle size.

The following can be understood from Examples 17 and 18 and Comparative Example 9 in which presence of Newton's rings is evaluated.

In Examples 17 and 18, the difference in refractive index between the resin and the microparticles is 0 or more and 0.015 or less, the average diameter of microparticles is 2.4 μm or more and 8 μm or less, the polymer content in the resin is 3 wt % or more and 20 wt % or less, the average thickness of the antiglare layer is 6.4 μm or more and 18 μm or less, and the microparticles are aggregated. Thus, occurrence of Newton's rings is suppressed.

In contrast, in Example 9, the difference in refractive index between the resin and the microparticles is 0 or more and 0.015 or less, the average diameter of microparticles is 2.4 μm or more and 8 μm or less, the polymer content in the resin is 3 wt % or more and 20 wt % or less, and the average thickness of the antiglare layer is 6.4 μm or more and 18 μm or less. However, since the microparticles are not adequately aggregated, Newton's rings occur.

Although the embodiments and examples of the present invention have been described in specific details, the scope of the present invention is not limited to the embodiments and examples described above and various modifications and alterations are possible on the basis of the technical idea of the present invention.

The figures, shapes, materials, and structures described in the embodiments and examples above are merely examples, and any other figures, shapes, materials, and structures may be used as occasion demands.

In the embodiments above, examples of applying the present invention to optical films installed on display faces of liquid crystal displays and methods for making such optical films are described. However, the present invention is not limited to this, and is applicable to optical films installed on display faces of various other display apparatuses such as cathode ray tube (CRT) displays, plasma display panels (PDPs), electro luminescence (EL) displays, surface-conduction electron-emitter displays (SEDs), etc, and to methods for making such optical films.

Moreover, in the embodiments and examples above, examples of using the optical film as an antiglare film and an anti-Newton ring film are described. However, the usage of the optical film is not limited to this, and the optical film is applicable to various other usages where both high transmission clarity and irregular profiles are desired.

Although the embodiments described above are applied to display apparatuses, the scope of the invention is not limited to this. For example, the embodiments are applicable to touch panels.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical film comprising:
a base member; and
an optical layer disposed on the base member, the optical layer having an asperity in a surface,
wherein the asperity is formed by applying a coating material containing microparticles and a resin on the base member, distributing the microparticles densely in some parts and sparsely in other parts by convections that occur in the coating material, and curing the coating material,
an average diameter of the microparticles is 2.4 μm or more and 8 μm or less,
an average thickness of the optical layer is 6.4 μm or more and 18 μm or less,
an arithmetic mean roughness Ra of a roughness profile of the surface of the optical layer is 0.03 μm or more and 0.15 μm or less and a root-mean-square slope RΔq of the roughness profile is 0.01 or more and 0.03 or less, and
the difference in refractive index between the resin and the microparticles is 0 or more and 0.015 or less.

2. The optical film according to claim 1, wherein a ratio R (=D/T×100, where T is the average thickness of the optical layer and D is the average diameter of the microparticles) is 30% or more and 70% or less.

3. The optical film according to claim 1, wherein the microparticles are mainly composed of a cross-linking poly(meth) acrylate copolymer having an acryl content of 55 wt % to 85 wt %.

4. The optical film according to claim 1, wherein a sum of transmitted image clarity measured with optical combs having a width of 0.125 mm, 0.5 mm, 1.0 mm, and 2.0 mm is 230 or more.

5. The optical film according to claim 1, wherein the resin contains 3 wt % or more and 20 wt % or less of a polymer and 80 wt % or more and 97 wt % or less of an oligomer and/or a monomer.

6. The optical film according to claim 5, wherein the resin contains 3 wt % or more and 20 wt % or less of the polymer and 80 wt % or more and 97 wt % or less of the oligomer.

7. A method for making an optical film comprising:
applying a coating material containing microparticles and a resin on a base member;
drying the coating material to create convections in the coating material and distributing the microparticles by the convections so that the microparticles are distributed densely in some parts and sparsely in other parts; and
curing the coating material in which the microparticles are distributed densely in some parts and sparsely in other parts to form an optical layer,
wherein an average diameter of the microparticles is 2.4 μm or more and 8 μm or less,
an average thickness of the optical layer is 6.4 μm or more and 18 μm or less,
an arithmetic mean roughness Ra of a roughness profile of a surface of the optical layer is 0.03 μm or more and 0.15 μm or less and a root-mean-square slope RΔq of the roughness profile is 0.01 or more and 0.03 or less, and
the difference in refractive index between the resin and the microparticles is 0 or more and 0.015 or less.

8. An antiglare film comprising:

a base member; and an antiglare layer disposed on the base member, the antiglare layer having an asperity in a surface, wherein the asperity is formed by applying a coating material containing microparticles and a resin on the base member, distributing the microparticles densely in some parts and sparsely in other parts by convections that occur in the coating material, and curing the coating material, an average diameter of the microparticles is 2.4 µm or more and 8 µm or less, an average thickness of the antiglare layer is 6.4 µm or more and 18 µm or less, an arithmetic mean roughness Ra of a roughness profile of the surface of the antiglare layer is 0.03 µm or more and 0.15 µm or less and a root-mean-square slope RΔq of the roughness profile is 0.01 or more and 0.03 or less, and the difference in refractive index between the resin and the microparticles is 0 or more and 0.015 or less.

9. An optical layer-attached polarizer comprising:

a polarizer; and an optical layer disposed on the polarizer, the optical layer having an asperity in a surface, wherein the asperity is formed by applying a coating material containing microparticles and a resin, distributing the microparticles densely in some parts and sparsely in other parts by convections that occur in the coating material, and curing the coating material, an average diameter of the microparticles is 2.4 µm or more and 8 µm or less, an average thickness of the optical layer is 6.4 µm or more and 18 µm or less, an arithmetic mean roughness Ra of a roughness profile of the surface of the optical layer is 0.03 µm or more and 0.15 µm or less and a root-mean-square slope RΔq of the roughness profile is 0.01 or more and 0.03 or less, and the difference in refractive index between the resin and the microparticles is 0 or more and 0.015 or less.

10. A display apparatus comprising:

a display unit configured to display images; and an optical layer disposed at a display surface side of the display unit, the optical layer having an asperity in a surface, wherein the asperity is formed by applying a coating material containing microparticles and a resin, distributing the microparticles densely in some parts and sparsely in other parts by convections that occur in the coating material, and curing the coating material, an average diameter of the microparticles is 2.4 µm or more and 8 µm or less, an average thickness of the optical layer is 6.4 µm or more and 18 µm or less, an arithmetic mean roughness Ra of a roughness profile of the surface of the optical layer is 0.03 µm or more and 0.15 µm or less and a root-mean-square slope RΔq of the roughness profile is 0.01 or more and 0.03 or less, and the difference in refractive index between the resin and the microparticles is 0 or more and 0.015 or less.

11. A display apparatus comprising:

a display unit configured to display images;

a front member disposed at a front surface side of the display unit; and an optical layer disposed at the front surface side of the display unit and/or a rear surface side of the front member, the optical layer having an asperity in a surface, wherein the asperity is formed by applying a coating material containing microparticles and a resin, distributing the microparticles densely in some parts and sparsely in other parts by convections that occur in the coating material, and curing the coating material, an average diameter of the microparticles is 2.4 µm or more and 8 µm or less, an average thickness of the optical layer is 6.4 µm or more and 18 µm or less, an arithmetic mean roughness Ra of a roughness profile of the surface of the optical layer is 0.03 µm or more and 0.15 µm or less and a root-mean-square slope RΔq of the roughness profile is 0.01 or more and 0.03 or less, and the difference in refractive index between the resin and the microparticles is 0 or more and 0.015 or less.

12. A display apparatus comprising:

a display unit configured to display images;

a rear member disposed at a rear surface side of the display unit; and an optical layer disposed at the rear surface side of the display unit and/or a front surface side of the rear member, the optical layer having an asperity in a surface, wherein the asperity is formed by applying a coating material containing microparticles and a resin, distributing the microparticles densely in some parts and sparsely in other parts by convections that occur in the coating material, and curing the coating material, an average diameter of the microparticles is 2.4 µm or more and 8 µm or less, an average thickness of the optical layer is 6.4 µm or more and 18 µm or less, an arithmetic mean roughness Ra of a roughness profile of the surface of the optical layer is 0.03 µm or more and 0.15 µm or less and a root-mean-square slope RΔq of the roughness profile is 0.01 or more and 0.03 or less, and the difference in refractive index between the resin and the microparticles is 0 or more and 0.015 or less.

* * * * *